(12) United States Patent
Cross et al.

(10) Patent No.: US 10,520,905 B2
(45) Date of Patent: Dec. 31, 2019

(54) USING FORECASTING TO CONTROL TARGET SYSTEMS

(71) Applicant: Veritone Alpha, Inc., Costa Mesa, CA (US)

(72) Inventors: Jonathan Cross, Bellevue, WA (US); David Kettler, Seattle, WA (US); Wolf Kohn, Seattle, WA (US); Michael Luis Sandoval, Bellevue, WA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 330 days.

(21) Appl. No.: 15/582,454

(22) Filed: Apr. 28, 2017

(65) Prior Publication Data

US 2017/0315523 A1 Nov. 2, 2017

Related U.S. Application Data

(60) Provisional application No. 62/329,096, filed on Apr. 28, 2016.

(51) Int. Cl.
*G05B 17/02* (2006.01)

(52) U.S. Cl.
CPC .................. *G05B 17/02* (2013.01)

(58) Field of Classification Search
CPC ................ G05B 17/02; G05B 13/048
See application file for complete search history.

(56) References Cited

U.S. PATENT DOCUMENTS 5,727,128 A 3/1998 Morrison
5,963,447 A 10/1999 Kohn et al.
(Continued)

FOREIGN PATENT DOCUMENTS

WO 2014/030349 A1 2/2014
WO 2014/089959 A1 6/2014
WO 2016/025080 A1 2/2016

OTHER PUBLICATIONS

Hyndman, "Forecasting Principles & Practice," dated Sep. 23-25, 2014, downloaded from http://robjhyndman.com/uwafiles/fpp-notes.pdf, University of Western Australia, pp. 5, 31, 32, 41, 42, 72, 73, 97-99, 105, 128 (13 pages).
Solomatine et al., "Data-Driven Modelling: Concepts, Approaches and Experiences," *Water Science and Technology Library* 68:17-30, 2008 (21 pages).
Ge et al., "Hybrid Systems: Chattering Approximation to Relaxed Controls," *Lecture Notes in Computer Science vol. 1066: Hybrid Systems III*, 1996, 25 pages.
(Continued)

*Primary Examiner* — Robert E Fennema
*Assistant Examiner* — Marzia T Monty
(74) *Attorney, Agent, or Firm* — VLP Law Group LLP; James A. D. White

(57) ABSTRACT

Techniques are described for implementing automated control systems to control operations of specified physical target systems. In some situations, the described techniques include forecasting future values of parameters that affect operation of a target system, and using the forecasted future values as part of determining current automated control actions to take for the target system—in this manner, the current automated control actions may be improved relative to other possible actions that do not reflect such forecasted future values. Various automated operations may also be performed to improve the forecasting in at least some situations, such as by combining the use of multiple different types of forecasting models and multiple different groups of past data to use for training the models, and/or by improving the estimated internal non-observable state information reflected in at least some of the models.

29 Claims, 23 Drawing Sheets

(56) References Cited

U.S. PATENT DOCUMENTS

| | | | |
|---|---|---|---|
| 6,088,689 | A | 7/2000 | Kohn et al. |
| 6,169,981 | B1 | 1/2001 | Werbos |
| 7,574,383 | B1 | 8/2009 | Parasnis et al. |
| 2002/0049899 | A1 | 4/2002 | Kenworthy |
| 2003/0069868 | A1 | 4/2003 | Vos |
| 2004/0260666 | A1 | 12/2004 | Pestotnik et al. |
| 2005/0273413 | A1 | 12/2005 | Vaudrie |
| 2006/0229769 | A1 | 10/2006 | Grichnik et al. |
| 2008/0167756 | A1 | 7/2008 | Golden et al. |
| 2009/0113049 | A1 | 4/2009 | Nasle et al. |
| 2010/0299287 | A1* | 11/2010 | Cao .................. H04L 41/142 706/12 |
| 2011/0035071 | A1 | 2/2011 | Sun et al. |
| 2011/0178622 | A1 | 7/2011 | Tuszynski |
| 2012/0072181 | A1 | 3/2012 | Imani |
| 2013/0080530 | A1 | 3/2013 | Frees et al. |
| 2013/0119916 | A1 | 5/2013 | Wang et al. |
| 2013/0253942 | A1 | 9/2013 | Liu et al. |
| 2013/0274936 | A1 | 10/2013 | Donahue et al. |
| 2014/0114517 | A1 | 4/2014 | Tani et al. |
| 2014/0217976 | A1 | 8/2014 | McGrath et al. |
| 2014/0250377 | A1 | 9/2014 | Bisca et al. |
| 2014/0277600 | A1 | 9/2014 | Kolinsky et al. |
| 2015/0058078 | A1 | 2/2015 | Ehrenberg et al. |
| 2015/0184550 | A1 | 7/2015 | Wichmann et al. |
| 2015/0279182 | A1 | 10/2015 | Kanaujia et al. |

OTHER PUBLICATIONS

Kohn et al., "Multiple Agent Hybrid Control: Carrier Manifolds and Chattering Approximations to Optimal Control," $33^{rd}$ Conference on Decision and Control Lake Buena Vista, FL, Dec. 1994, 7 pages.

Kohn et al., "A Hybrid Systems Approach to Computer-Aided Control Engineering," *IEEE Control Systems* 15(2), 1995, 30 pages.

Kohn et al., "Hybrid Systems as Finsler Manifolds: Finite State Control as Approximation to Connections," *Lecture Notes in Computer Science vol. 999: Hybrid Systems II*, 1995, 28 pages.

Kohn et al., "Viability in Hybrid Systems," *Theoretical Computer Science* 138, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," *Lecture Notes in Computer Science vol. 1201: Hybrid and Real-Time Systems*, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," *Houston Journal of Mathematics* 28(2), 2002, 23 pages.

Kohn et al., "A Micro-Grid Distributed Intelligent Control and Management System," *IEEE Transactions on Smart Grid* 6(6), Nov. 2015, 11 pages.

\* cited by examiner

USING FORECASTING TO CONTROL TARGET SYSTEMS

CROSS-REFERENCE TO RELATED APPLICATIONS

This application claims the benefit of U.S. Provisional Patent Application No. 62/329,096, filed Apr. 28, 2016 and entitled "Using Forecasting To Control Target Systems," which is hereby incorporated by reference in its entirety.

BACKGROUND

Various attempts have been made to implement automated control systems for various types of physical systems having inputs or other control elements that the control system can manipulate to attempt to provide desired output or other behavior of the physical systems being controlled. Such automated control systems have used various types of architectures and underlying computing technologies to attempt to implement such functionality, including to attempt to deal with issues related to uncertainty in the state of the physical system being controlled, the need to make control decisions in very short amounts of time and with only partial information, etc. One example of such an automated control system includes a system for controlling operations of a battery that is discharging electrical power to support a load and/or is charging using electrical power from a source, potentially with ongoing changes in load, source and/or battery internal state.

However, various difficulties exist with existing automated control systems and their underlying architectures and computing technologies, including with respect to managing uncertainty in future values of parameters that can affect operation of the automated control systems.

DETAILED DESCRIPTION

Figure 1A:
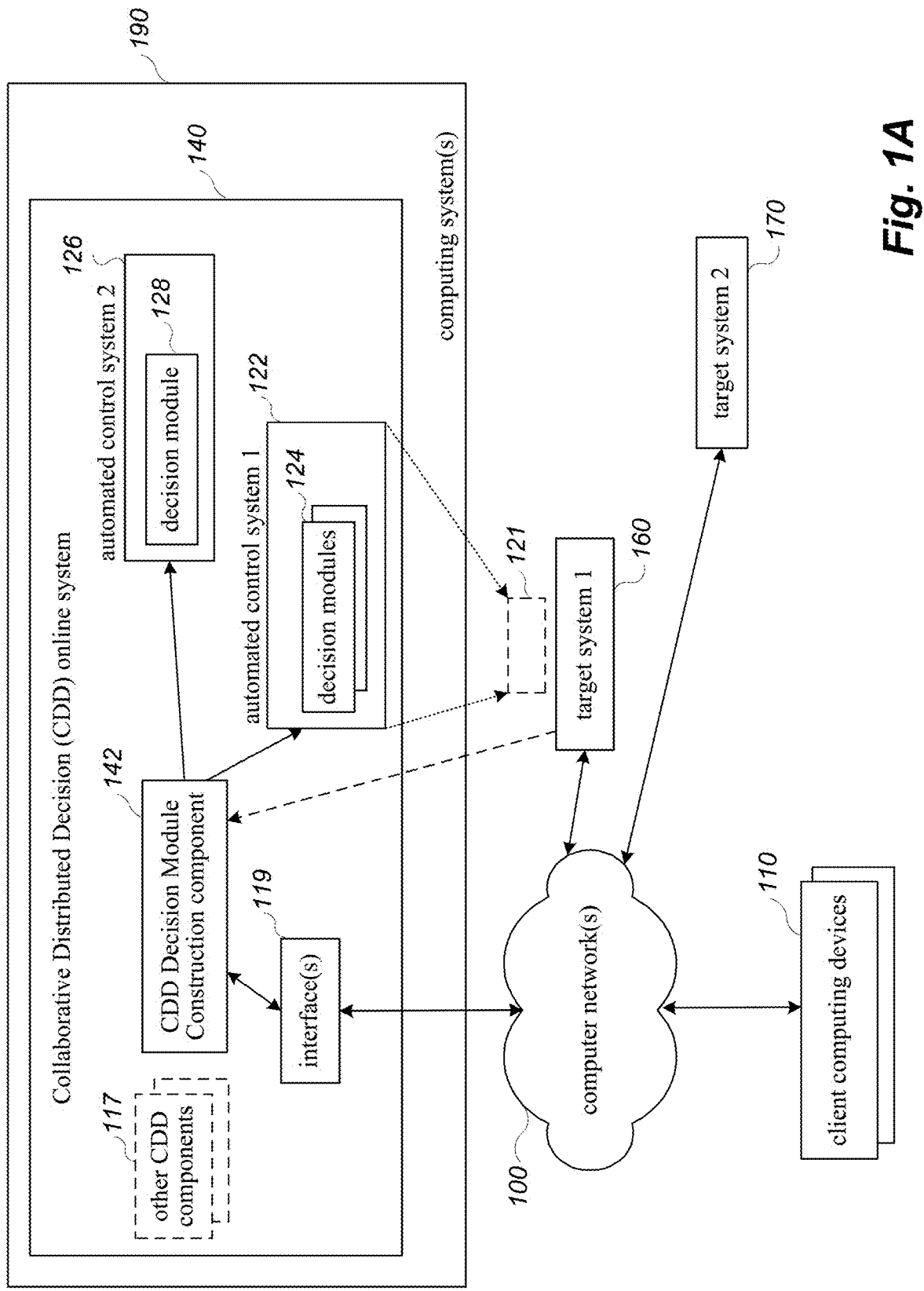
FIG. 1A is a network diagram illustrating an example environment in which a system for performing cooperative distributed control of target systems may be configured and initiated.

Techniques are described for implementing automated control systems to control or otherwise manipulate at least some operations of specified physical systems or other target systems. In at least some embodiments, the described techniques include forecasting future values of parameters that affect operation of a target system, and using the forecasted future values as part of determining current automated control actions to take for the target system—in this manner, the current automated control actions may be optimized or otherwise improved relative to other possible actions that do not reflect such forecasted future values. In addition, various automated operations may be performed to improve the forecasting in at least some embodiments, such as by combining the use of multiple different types of forecasting models and multiple different groups of past data to use for training the models, and/or by improving the estimated internal non-observable state information reflected in at least some of the models. In general, forecasting may be performed on any selected variables that can be represented in a model, while "control" variables that are not forecast may be other values that affect the forecasts. Additional details related to performing and improving such forecasting and to using such forecasted future values in particular manners are described below, and some or all of the described techniques are performed in at least some embodiments by automated operations of one or more Parameter Value Forecaster ("PVF") components, optionally as part of or in conjunction with one or more CDD (Collaborative Distributed Decision) systems controlling specific types of target systems.

The described techniques for forecasting future values of parameters and for using the forecasted future values as part of determining current automated control actions to take may be performed for various types of target systems in various embodiments. As one non-exclusive example, the physical target system may include one or more batteries used to store and provide electrical power (e.g., for a local load, for an electrical grid that supports various loads in various locations, etc.), and the automated operations to control the target system may include using characteristics of each battery's state to perform automated control of DC (direct current) power that is provided from and/or stored by the battery, with a specified goal for controlling operation of the target system including maximizing life of the battery while supplying energy from the battery according to indicated criteria. In such embodiments, the automated operations of the PVF system may include forecasting future demand for electrical power that is requested to be supplied from the one or more batteries, and/or forecasting future supply of electrical power available to be supplied to the one or more batteries, and/or forecasting future prices of such power to be supplied from and/or to the batteries—given one or more such forecasted future values, a CDD system that controls the one or more batteries may then use such information to make decisions on current control actions that better support such predicted future scenarios when they occur (e.g., to minimize current electrical power output and/or to increase current electrical power storing activities if demand for electrical power is forecast to increase significantly in the near future, such as in the next few minutes or hours).

As another non-exclusive example, the physical target system may include one or more computer networks over which network traffic passes, such as networks that include firewall devices and/or other network devices that can regulate some or all of the network traffic, and the automated operations to control the target system may include using characteristics of network traffic to perform automated control of the firewall devices or other regulation devices (e.g., to block or otherwise handle unauthorized network traffic, such as an intrusion attempt or other cyber-attack; to detect and address anomalies in network traffic, such as to identify that one or more network links and/or nodes have failed or are otherwise unavailable; etc.), with a specified goal for controlling operation of the target system including minimizing network traffic that is permitted by the one or more network devices and that does not satisfy one or more indicated criteria while permitting other network traffic that does satisfy the one or more indicated criteria. In such embodiments, the automated operations of the PVF system may include forecasting future network traffic that is expected to occur (e.g., incoming traffic to the computer network and/or outgoing traffic from the computer network and/or internal traffic between nodes on the computer network, such as with respect to one or more of amount/volume, timing, type, etc.)—given one or more such forecasted future values, a CDD system that controls the firewall devices or other regulation devices may identify significant differences between actual and forecasted network traffic and make decisions on current control actions to address any corresponding problems.

As another non-exclusive example, the physical target system may include a multi-room building that includes heating and/or cooling capabilities (e.g., one or more HVAC, or heating, ventilation and air conditioning, units), and the automated operations to control the target system may include using characteristics of a subset of the rooms (e.g., temperatures measured in a subset of the rooms that have temperature sensors) to perform automated control of heating and/or cooling that is provided from the heating and/or cooling capabilities to all of the rooms, with a specified goal for controlling operation of the target system including minimizing an amount of energy used by the temperature control units while performing the at least one of heating and cooling for the rooms of the building according to indicated criteria. In such embodiments, the automated operations of the PVF system may include forecasting one or more of future inputs to, future outputs from, future control signal instructions provided to and other future state of the heating and/or cooling capabilities and of at least some rooms of the building (e.g., internal temperature readings, amount of time and/or energy usage of the heating and/or cooling capabilities, temperature readings external to the building as part of its surrounding environment, etc.)—given one or more such forecasted future values—a CDD system that controls the heating and/or cooling capabilities may then identify significant differences between actual and forecasted conditions and make decisions on current control actions to address any corresponding problems.

Additional details are included below related to such forecasting and use of forecasted parameter values, and it will be appreciated that the described techniques for forecasting future parameter values and for using such forecasted future values may be used with a variety of other types of target systems in other embodiments, some of which are described further below.

As noted above, various automated operations may be performed to improve the forecasting in at least some embodiments, such as by combining the use of multiple different types of forecasting models and multiple different periods of past data to use for training the models. For example, at least some embodiments maintain multiple different such models, and repeatedly evaluate the various models' current performance, such as to enable a "best" model (with respect to one or more defined evaluation criteria) to be chosen and used at a given time from the multiple models, as well as to optionally remove one or more "worst" models (again with respect to one or more defined evaluation criteria, whether the same as or different from the criteria used for evaluating the best model) from the group of multiple models in use. In at least some such embodiments, some or all of the models may also be repeatedly retrained (e.g., using the most current data), such as to use the most recent X data (where X is a defined amount of time or other defined amount of data, and optionally different amounts for different models), including to use different data amounts for different models (e.g., with a given initial model trained on X amount of past data being treated as a different resulting model for the purpose of evaluation and selection of best and worst models than that same initial model trained on a different Y amount of past data; with different types of models using different data amounts; etc.). Additional details are included below related to such combining of the use of multiple different types of forecasting models and multiple different periods or other amounts of past data to use for training the models.

Non-exclusive examples of types of forecasting techniques and resulting models include the following: ordinary regression; ordinary autoregression; dynamic regression and/or dynamic autoregression, in which coefficients are updated as new data becomes available; discounted dynamic regression and/or discounted dynamic autoregression, in which coefficients are updated with new data as it becomes available, and in which newer data is given more weight and/or importance than older data; maintain previous data (e.g., may be useful if data is unpredictable); a Kalman filter with fixed coefficients; a dynamic Kalman filter where the coefficients (e.g., A, B, and C) are updated as new data becomes available (e.g., as part of a parameter adaptation engine, or "PAE"); a neural network; a decision tree; other variations of Kalman filters and regressive models; etc. Non-exclusive examples of amounts of data to use for training include the following, such as for time-series data or other time-based data that changes over time (e.g., that has associated time metadata with some or all data values): last 5 data values or last 5 time periods (e.g., last 5 seconds, last 5 minutes, last 5 hours, last 5 days, last 5 weeks, last 5 months, last 5 years, etc.); last 10 or 20 or 50 or 100 or 500 or 1000 or 5000 or 10000 or 50000 or 100000 or 500000 or 1000000 data values or time periods; a specified N amount of data values or time periods that are not the last available (e.g., the first available, during a specified time period, etc.); etc. In addition, when training a model, various error functions may be used during optimization in various embodiments, including the following non-exclusive examples: squared error; mean absolute error; percentage error (for positive values only); etc. Additional details are included below related to types of models, forecasting techniques, use of data for training, and error functions.

As noted above, various automated operations may be performed to improve the forecasting in at least some embodiments, such as by improving the estimated internal non-observable state information reflected in at least some of the models in use. With respect to such improvement operations, some types of models and forecasting techniques (e.g., those referred to above as "dynamic", some types of network networks and decision trees, etc.) may have coefficients or parameters or other representations of values specific to a particular target system, such as to reflect an internal state of that target system or other information about that target system. In at least some embodiments, the described techniques include updating parameters of such models over time during their use, such as to further adapt those models to a particular target system (e.g., to better reflect a non-changing internal state of the target system, and/or to capture a changing internal state of the target system). In some such embodiments, such model adaptation includes using a parameter adaptation engine based on a Kalman filter on the parameter values in the model. In addition, in some such embodiments, such model adaptation includes automated model retraining, in which models are periodically retrained from scratch using a subset of existing data (e.g., with their performance then evaluated on a distinct subset), whether in addition to or instead of using a parameter adaptation engine based on a Kalman filter on the parameter values in the model. In other embodiments, parameters of models are not updated during use for some or all situations and/or during some or all times. Additional details are included below related to such improving of the estimated internal non-observable state information reflected in at least some of the models in use.

For illustrative purposes, some additional details are included below regarding some embodiments in which specific types of operations are performed in specific manners, including with respect to particular types of target systems and for particular types of control activities determined in particular manners. These examples are provided for illustrative purposes and are simplified for the sake of brevity, and the inventive techniques may be used in a wide variety of other situations, including in other environments and with other types of automated control action determination techniques, some of which are discussed below.

However, before further discussion of the forecasting techniques and their uses, a more general description of the control of target systems using such representations and other models is provided. In particular, FIG. 1A is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing devices 110 to interact over one or more intervening computer networks 100 with the CDD system 140 to configure and create one or more decision modules to include as part of an automated control system to use with each of one or more target systems to be controlled.

In particular, target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) of the client computing devices may interact with the CDD system 140 to generate an example automated control system 122 for target system 1, with the automated control system including multiple decision modules 124 in this example that will cooperatively interact to control portions of the target system 1 160 when later deployed and implemented. The process of the users interacting with the CDD system 140 to create the automated control system 122 may involve a variety of interactions over time, including in some cases independent actions of different groups of users, as discussed in greater detail elsewhere. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time. In some embodiments and situations, such initial user interactions may be used to generate an initial rule-based system model of a target system that is based on binary rules, such as reflected in the example CDI agent 250 of FIG. 2A—if so, embodiments of one or more forecasting models and corresponding PVF components may then be used to forecast various types of data to improve control of the target system, such as with respect to the example Power Demand Forecaster component 270c, Power Supply Forecaster component 270b and/or Power Price Forecaster component 270a of FIG. 2A.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of the target system 1. In addition, in embodiments and situations in which initial user interactions are used to generate an initial rule-based system model of a target system that is based on binary rules, the initially deployed automated control system 122 may be based on such an initial rule-based system model, and data from the operation of the target system under control of that initially deployed automated control system 122 may be gathered and used for subsequent automated improvements for one or more forecasting models and/or corresponding PVF components, such as to retrain such forecasting models and/or to improve estimated internal non-observable state information reflected in the forecasting models, with revised versions of one or more such forecasting models subsequently deployed and used with the automated control system 122 to improve their functionality.

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module 128 that will perform all of the control actions for the automated control system 126. The automated control system 126 may similarly be deployed and implemented for target system 2 in a manner similar to that discussed with respect to automated control system 122, such as to execute locally on the one or more computing systems 190 and/or on one or more computing systems (not shown) that are part of the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1A.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, including to support a single user or a group of related users (e.g., a company or other organization), such as if the one or more computer networks 100 are instead an internal computer network of the company or other organization, and with such a copy of the CDD system optionally not being available to other users external to the company or other organization. The online version of the CDD system 140 and/or local copy version of the CDD system 140 may in some embodiments and situations operate in a fee-based manner, such that the one or more users provide various fees to use various operations of the CDD system, such as to perform interactions to generate decision modules and corresponding automated control systems, and/or to deploy or implement such decision modules and corresponding automated control systems in various manners. In addition, the CDD system 140, each of its components (including component 142 and optional other components 117, such as one or more CDD Control Action Determination components and/or one or more CDD Coordinated Control Management components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

Figure 1B:
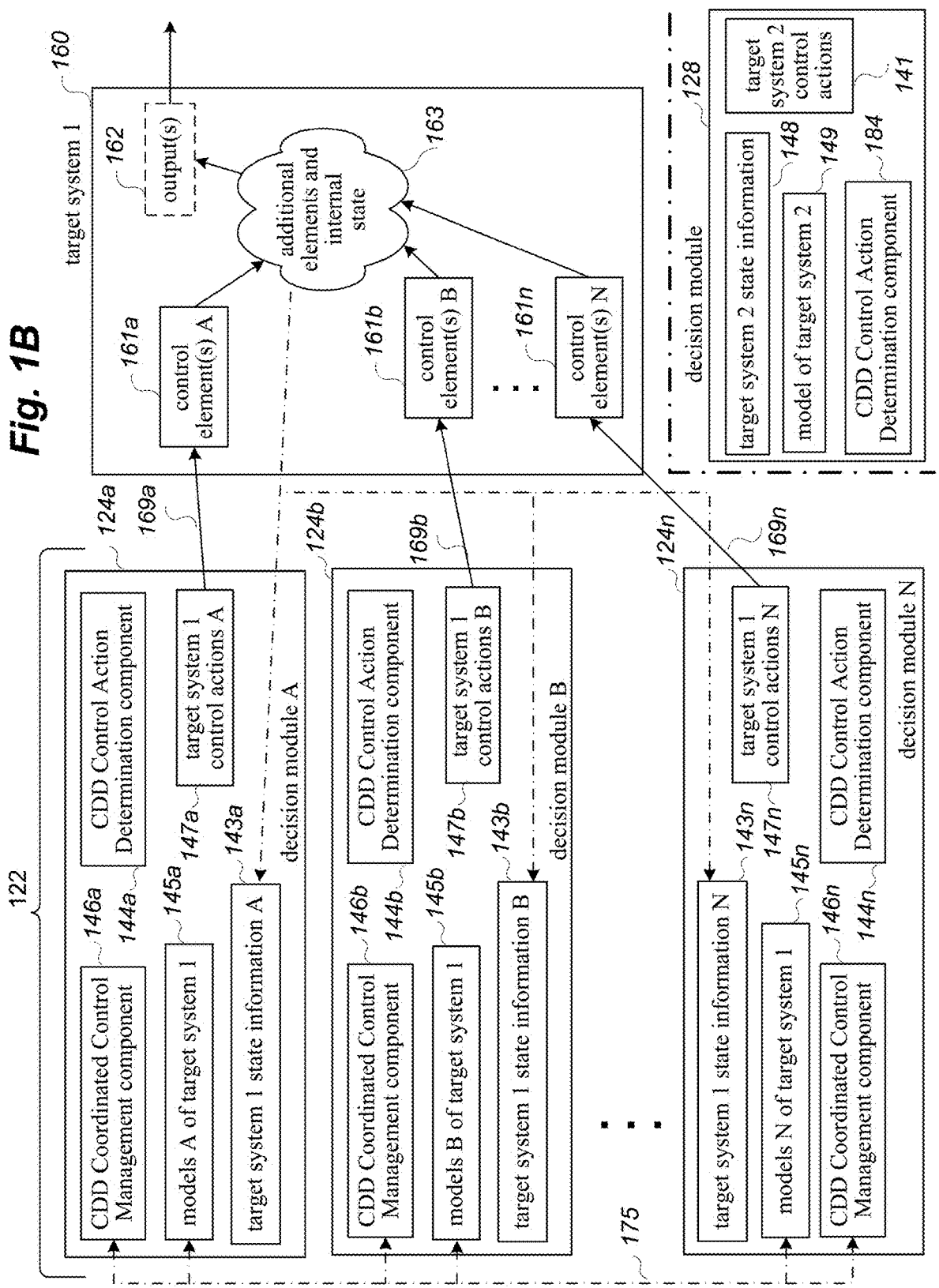
FIG. 1B is a network diagram illustrating an example environment in which a system for performing cooperative distributed control of target systems may be implemented.

FIG. 1B is a network diagram illustrating an example environment in which a system for performing cooperative distributed control of target systems may be implemented, and in particular continues the examples discussed with respect to FIG. 1A. In the example environment of FIG. 1B, target system 1 160 is again illustrated, with the automated control system 122 (whether an initial or revised version) now being deployed and implemented to use in actively controlling the target system 1 160. In the example of FIG. 1B, the decision modules 124 are represented as individual decision modules 124a, 124b, etc., to 124n, and may be executing locally to the target system 1 160 and/or in a remote manner over one or more intervening computer networks (not shown). In the illustrated example, each of the decision modules 124 includes a local copy of a CDD Control Action Determination component 144, such as with component 144a supporting its local decision module 124a, component 144b supporting its local decision module 124b, and component 144n supporting its local decision module 124n. Similarly, the actions of the various decision modules 124 are coordinated and synchronized in a peer-to-peer manner in the illustrated embodiment, with each of the decision modules 124 including a copy of a CDD Coordinated Control Management component 146 to perform such synchronization, with component 146a supporting its local decision module 124a, component 146b supporting its local decision module 124b, and component 146n supporting its local decision module 124n.

As the decision modules 124 and automated control system 122 execute, various interactions 175 between the decision modules 124 are performed, including to share information about current models and other state of the decision modules to enable cooperation and coordination between various decision modules, such as for a particular decision module to operate in a partially synchronized consensus manner with respect to one or more other decision modules (and in some situations in a fully synchronized manner in which the consensus actions of all of the decision modules 124 converge). During operation of the decision modules 124 and automated control system 122, various state information 143 may be obtained by the automated control system 122 from the target system 160, such as initial state information and changing state information over time, and including outputs or other results in the target system 1 from control actions performed by the decision modules 124. Such state information may, for example, be gathered and used for subsequent automated improvements to one or more forecasting models being used, although such operations are not illustrated in FIG. 1B.

The target system 1 in this example includes various control elements 161 that the automated control system 122 may manipulate, and in this example each decision module 124 may have a separate group of one or more control elements 161 that it manipulates (such that decision module A 124a performs interactions 169a to perform control actions A 147a on control elements A 161a, decision module B 124b performs interactions 169b to perform control actions B 147*b* on control elements B 161*b*, and decision module N 124*n* performs interactions 169*n* to perform control actions N 147*n* on control elements N 161*n*). Such control actions affect the internal state 163 of other elements of the target system 1, including optionally to cause or influence one or more outputs 162. As operation of the target system 1 is ongoing, at least some of the internal state information 163 is provided to some or all of the decision modules to influence their ongoing control actions, with each of the decision modules 124*a*-124*n* possibly having a distinct set of state information 143*a*-143*n*, respectively, in this example.

As discussed in greater detail elsewhere, each decision module 124 may use such state information 143 and a local model 145 of the decision module for the target system to determine particular control actions 147 to next perform, such as for each of multiple time periods, although in other embodiments and situations, a particular automated control system may perform interactions with a particular target system for only one time period or only for some time periods. For example, the local CDD Control Action Determination component 144 for a decision module 124 may determine a near-optimal location solution for that decision module's local model 145, and with the local CDD Coordinated Control Management component 146 determining a synchronized consensus solution to reflect other of the decision modules 124, including to update the decision module's local model 145 based on such local and/or synchronized solutions that are determined. Thus, during execution of the automated control system 122, the automated control system performs various interactions with the target system 160, including to request state information, and to provide instructions to modify values of or otherwise manipulate control elements 161 of the target system 160. For example, for each of multiple time periods, decision module 124*a* may perform one or more interactions 169*a* with one or more control elements 161*a* of the target system, while decision module 124*b* may similarly perform one or more interactions 169*b* with one or more separate control elements B 161*b*, and decision module 124*n* may perform one or more interactions 169*n* with one or more control elements N 161*n* of the target system 160. In other embodiments and situations, at least some control elements may not perform control actions during each time period.

While example target system 2 170 is not illustrated in FIG. 1B, further details are illustrated for decision module 128 of automated control system 126 for reference purposes, although such a decision module 128 would not typically be implemented together with the decision modules 124 controlling target system 1. In particular, the deployed copy of automated control system 126 includes only the single executing decision module 128 in this example, although in other embodiments the automated control system 126 may include other components and functionality. In addition, since only a single decision module 128 is implemented for the automated control system 126, the decision module 128 includes a local CDD Control Action Determination component 184, but does not in the illustrated embodiment include any local CDD Coordinated Control Management component, since there are not other decision modules with which to synchronize and interact.

While not illustrated in FIGS. 1A and 1B, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues control operations of a corresponding target system. As one example, at least some such modifications may reflect operations of one or more PVF components to improve one or more forecasting models at one or more times, including to use new control and state information that becomes available to retrain such forecasting models and/or to improve estimated internal non-observable state information reflected in the forecasting models, with revised versions of one or more such forecasting models subsequently deployed and used. In addition, while each automated control system is described as controlling a single target system in the examples of FIGS. 1A and 1B, in other embodiments and situations, other configurations may be used, such as for a single automated control system to control multiple target systems (e.g., multiple inter-related target systems, multiple target systems of the same type, etc.), and/or multiple automated control systems may operate to control a single target system, such as by each operating independently to control different portions of that target control system. It will be appreciated that other configurations may similarly be used in other embodiments and situations.

As noted above, in at least some embodiments, the physical target systems include one or more batteries used to store and provide electrical power, and the automated operations to control the target systems include using characteristics of each battery's state to perform automated control of DC (direct current) power that is provided from the battery, such as by using a DC-to-DC converter (e.g., a FET, or field-effect transistor, switching converter) connected to the battery to control an amount of electrical current and/or voltage being output from the battery, in a real-time manner and to optimize long-term operation of the battery. The DC-to-DC converter may, for example, be part of a buck converter (or step-down converter) that steps down voltage while stepping up current from its input (supply) to its output (load) and/or be part of a boost converter (or step-up converter) that steps up voltage while stepping down current from its input (supply) to its output (load), referred to generally at times herein as a "boost/buck controller" or "buck/boost controller". In addition, in some embodiments and situations, multiple batteries may be controlled in such a manner by using multiple control systems that are each associated with one of the batteries, and with the overall control of the multiple batteries being coordinated in a distributed manner, such as based on interactions between the multiple associated control systems for the multiple batteries. A system that includes one or more batteries to be controlled may further include additional components in some embodiments and situations, such as one or more electrical sources and/or one or more electrical loads, with one non-exclusive example of such a type of system being one or more home or business electrical power systems that may optionally include electrical generation sources (e.g., solar panels, wind turbines, etc.) as well as electrical load from the house or business.

Figure 2A:
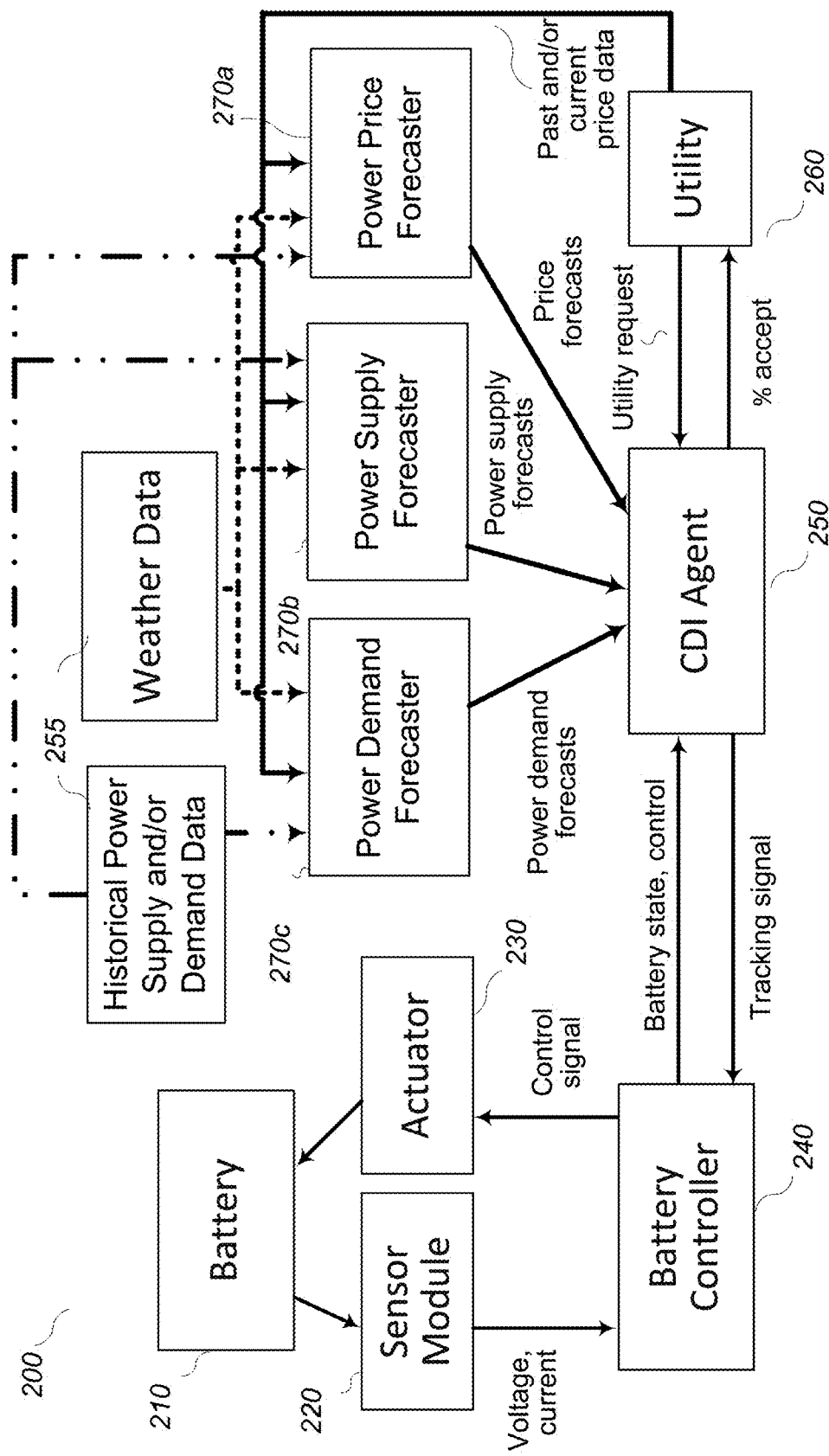
FIG. 2A is a block diagram illustrating example components of an embodiment of a system for performing automated control of DC power from a battery based in part on automated forecasts related to electrical power.

FIG. 2A includes a block diagram 200 illustrating example components of an embodiment of a system for using characteristics of a battery's state along with other related information to perform automated control of DC power from the battery—in particular, various components of example system 200 interact to control operations of the battery according to one or more defined goals in light of defined constraints, rules and other criteria, as discussed further below. In some embodiments, the automated activities to control the battery may be performed in a real-time manner and/or to optimize long-term operation of the battery (e.g., the life of the battery), based in part of forecasted future values for power demand and/or power supply and/or power pricing, while satisfying as many external requests for power (e.g., from a utility to which the battery can supply power) as is possible (e.g., at least a defined percentage or quantity of such requests).

In the illustrated example of FIG. 2A, a battery 210 is shown that is being controlled via an actuator 230 receiving a corresponding control signal from a battery controller component 240 (also referred to as a "tracking controller" and/or "battery tracking controller" at times herein), such as by the battery controller specifying an amount of power to be generated as DC output of the battery. The specified power amount to be generated may include information indicating, for example, to increase or decrease the power being output by a specified amount, or to not change the power output. While not illustrated here, the output of the battery may serve to provide power to one or more loads (not shown), and in at least some embodiments may be connected to an inverter/rectifier component to convert the power output of the battery to AC power to support corresponding loads—such an inverter may, for example, control power being provided from the battery by regulating voltage and/or frequency of the AC power. Similarly, while also not illustrated here, input to the battery may serve to receive power from one or more sources (not shown), and in at least some embodiments may be connected to an inverter/rectifier component to convert AC power input from the sources to DC power for the battery—such a rectifier may, for example, control power being provided to the battery by regulating voltage and/or frequency of the AC power.

In addition, additional data source elements 255 and 260 of FIG. 2A allow one or more forecaster components 270 (each potentially including multiple forecasting models, not shown) of the system 200 to obtain and use information to forecast one or more types of power-related information, such as based on past and/or current weather data, past and/or current price data, past and/or current data about power supply and/or demand, etc. In this example, the forecaster components include a power price forecaster component 270a that forecasts prices for power supplied to and/or from the utility, a power demand forecaster component 270c that forecasts demand for power supplied from the battery, and a power supply forecaster component 270b that forecasts supply available of power to be supplied from the battery, although in other embodiments one or more such components may not be present and/or may be combined (e.g., to replace the components 270b and 270C with a single power demand/supply forecaster that predicts positive and negative demand, with negative demand indicating available supply). The CDI agent 250 may then receive such forecasted data, and use it together with other types of data described below, to manage the control of the battery to optimize or otherwise enhance one or more financial constraints and/or power availability constraints, such as in combination with other constraints related to battery life and/or other performance characteristics.

As part of determining how to control the battery, the battery controller component receives input from a sensor module 220 regarding an internal state (not shown) of the battery, such as current values for voltage, electrical current, temperature, etc., and supplies corresponding information to a CDI agent 250. The CDI agent, which is also referred to at times herein as a CDD (Collaborative Distributed Decision) decision module or system, receives the information from the battery controller related to the state of the battery, and also receives power supply requests from a utility component 260, such as in a situation in which the battery supplies power at some or all times to an electrical grid (not shown) controlled by the utility, as well as the one or more types of forecasted data noted above. In particular, the CDI agent receives a particular request from the utility, receives and analyzes information about the state of the battery and about one or more types of forecasted data, and determines corresponding operations to take at the current time for the battery (e.g., an amount of output power to be supplied from the battery, and/or an amount of input power to be received and stored by the battery), which in at least some situations involve attempting to fully or partially satisfy the request from the utility for power in a real-time manner if the request can be satisfied in a way that also satisfies other constraints on the battery performance given the current state of the battery and the defined goal(s), such as to enable the battery to operate in a desired non-saturation range or level (e.g., with respect to an estimated internal temperature of the battery and/or estimated internal chemistry of the battery), as well as to support likely future operations reflected in the forecasted data. After determining the corresponding operations to take at the current time for the battery, the CDI agent provides a corresponding tracking control signal to the battery controller, which determines how to currently modify or manipulate the actuator to effectuate the corresponding operations for the tracking control signal (e.g., an amount of positive or negative change to make in an amount of current being output from the battery), and sends a corresponding control signal to the actuator as discussed above. While not illustrated in FIG. 2A, information about the corresponding operations for the battery (e.g., tracking control signals and corresponding battery state information, resulting control signals and resulting battery state operations and state information, etc.) may further be supplied to one or more of the components 270 and/or one or more other PVF components (not shown) to use in improving one or some or all forecasting models in use by the components 270, including to use such information about battery operations to retrain such forecasting models and/or to improve estimated internal non-observable state information reflected in the forecasting models, with revised versions of one or more such forecasting models subsequently deployed and used.

While also not illustrated in FIG. 2A, the CDI Agent and/or battery controller may in some embodiments include a stored model of the battery that is used to estimate internal state of the battery and to select particular operations to perform based in part on that internal state. For example, in some embodiments a generic battery model may be used that is applicable to any type of battery, while in other embodiments a battery model may be used that is specific to a type of the battery (e.g., a type of chemical reaction used to store and/or generate electricity, such as lithium ion or nickel cadmium), while in yet other embodiments a battery model may be used that is designed and/or configured specifically for the particular battery in use. In addition, in at least some embodiments, a battery model that is initially employed in a particular system with a particular battery may be updated over time, such as to reflect improvements to the underlying structure of the model and/or to train the model to reflect operational characteristics specific to the particular battery and/or system in use (e.g., by monitoring how changes in observable battery state correlate to corresponding external battery electrical load and/or electrical source)—when training or otherwise adapting a model to a particular battery and/or system, the training/adaption operations may in some embodiments be performed initially in a training phase before using the automated control system to control the battery, and/or in some embodiments may be performed continuously or periodically while the automated control system is controlling the battery (e.g., to reflect changes over time in an impedance profile of the battery). Additional details are included elsewhere herein regarding such models, including their construction and use. In addition, while in some embodiments the battery controller and CDI agent may be implemented as separate components (e.g., with the battery controller implemented in whole or in part in hardware and/or firmware that is attached to the battery or otherwise at a location of the battery, and with the CDI agent implemented in part by software instructions executing on one or more computing systems remote from the battery location and optionally communicating with the battery controller over one or more intervening computer networks), in other embodiments the CDI agent and battery controller may be implemented as a single component (whether at the location of the battery or remote from it). Further details regarding operation of the CDI agent to determine operations to take for the battery are discussed in greater detail below.

In addition, while not illustrated with respect to FIG. 2A, in some embodiments multiple batteries (e.g., tens, hundreds, thousands, millions, etc.) may each have an associated CDI agent that controls actions of that battery in a similar manner, and with the various batteries acting together in a coordinated manner to supply aggregate power to the utility or to other entities. In such embodiments, the utility or other external entity may send synchronization and monitoring signals for use by the various systems including the batteries, and the multiple CDI agents associated with the various batteries may interact to exchange information and maintain at least partial coordination between the operations of the batteries. Some further aspects of performing automated operations to control such a target system with one or more batteries and/or other types are target systems are included in U.S. patent application Ser. No. 15/096,091, Apr. 11, 2016 and entitled "Using Battery DC Characteristics To Control Power Output;" U.S. patent application Ser. No. 14/746,738, filed Jun. 22, 2015 and entitled "Cooperative Distributed Control Of Target Systems;" in U.S. Patent Application No. 62/182,968, filed Jun. 22, 2015 and entitled "Applications Of Cooperative Distributed Control Of Target Systems;" in U.S. Patent Application No. 62/182,796, filed Jun. 22, 2015 and entitled "Gauge Systems;" and in international PCT Patent Application No. PCT/US2015/037022, filed Jun. 22, 2015 and entitled "Cooperative Distributed Control Of Target Systems," each of which is hereby incorporated by reference in its entirety.

Figure 2B:
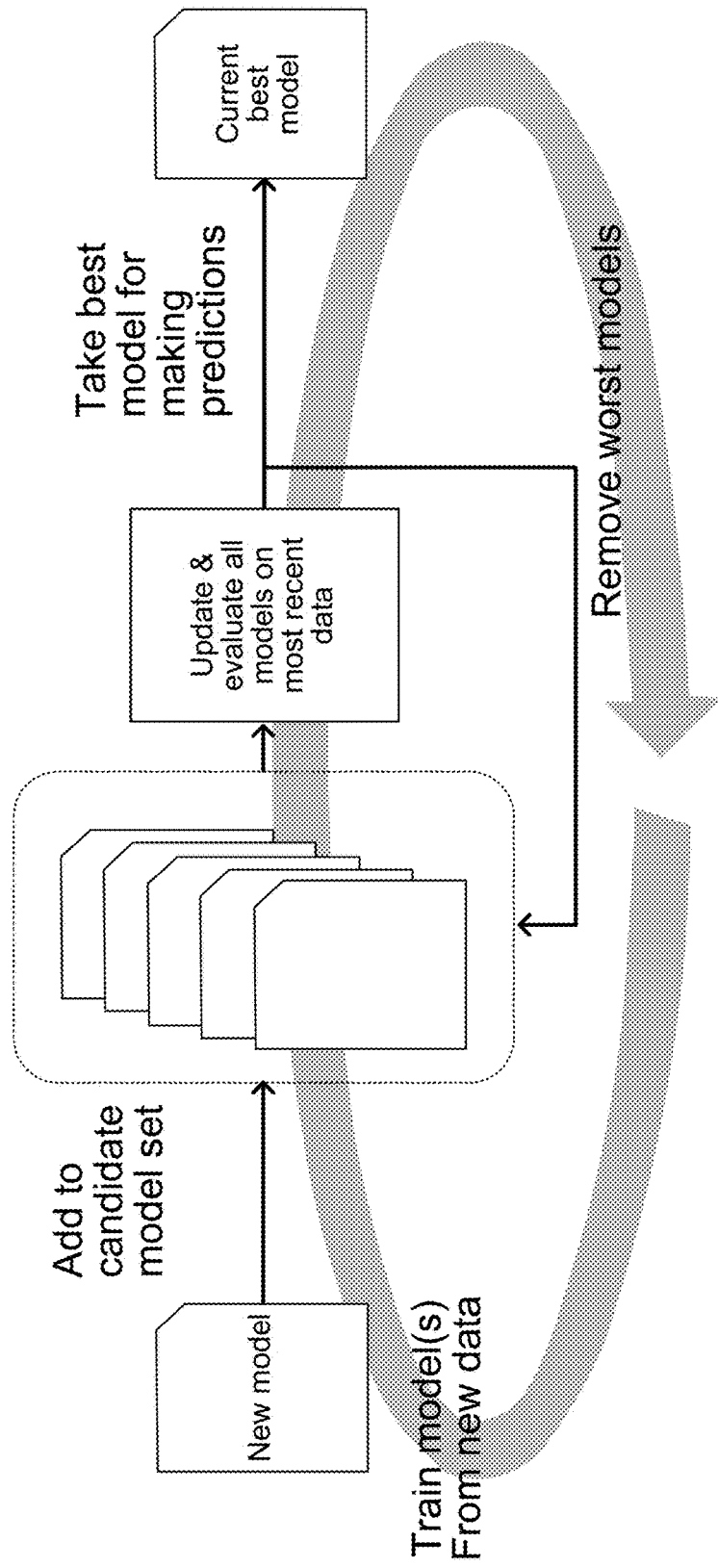
FIG. 2B is a block diagram illustrating examples of retraining and updating models used for forecasting information, to improve performance of the models.
Figure 2C:
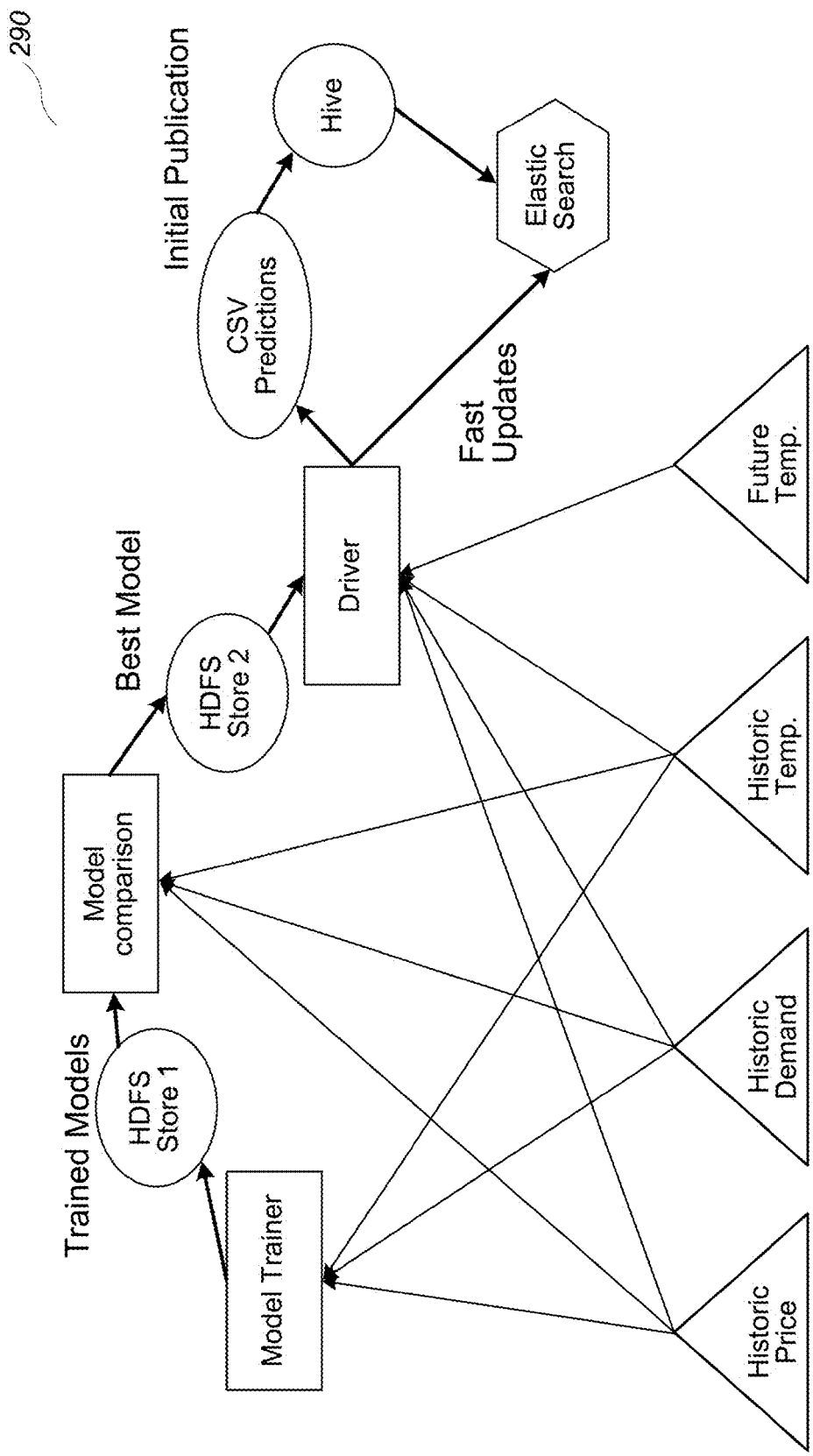
FIG. 2C is a block diagram illustrating examples of performing automated control of DC power from a battery based in part on automated forecasts related to electrical power.
Figure 2D:
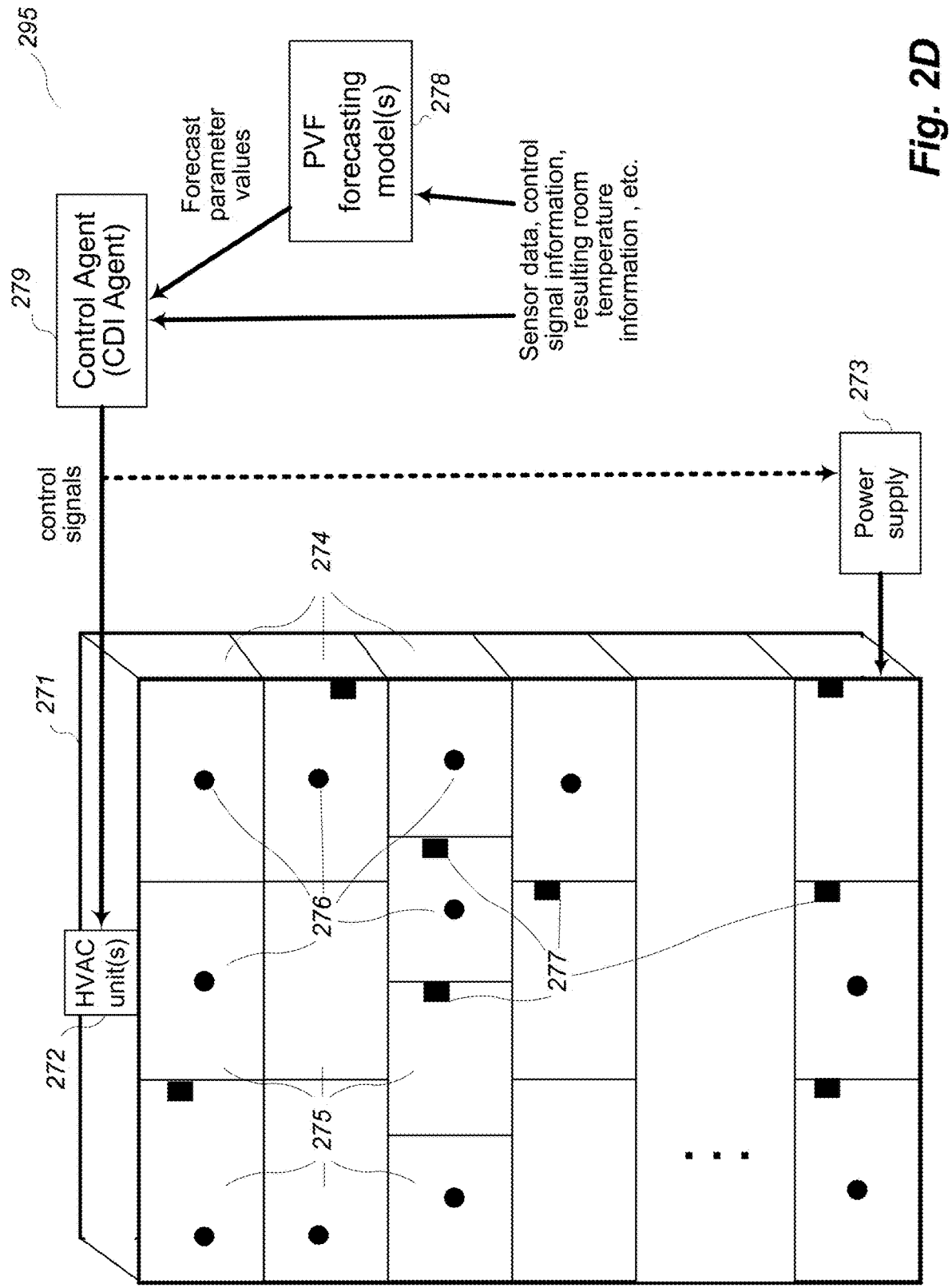
FIG. 2D is a block diagram illustrating example components of an embodiment of a system for performing automated control of DC power from a battery based in part on a state of the battery that is modeled using sensor data.

FIG. 2D includes a block diagram 295 illustrating example components of an embodiment of another target system being automatically controlled by a CDI control agent 279, such as based in part on forecast information from one or more PVF forecasting models 278. In this example, the control agent 279 performs automated operations to control heating and/or cooling of a building 271 via one or more HVAC units 272, such as to satisfy one or more defined goals in light of defined constraints, rules and other criteria that are represented in the control agent. In some embodiments, the automated activities to control the HVAC unit(s) may be performed in a real-time manner and/or to optimize the costs of the heating and/or cooling activities, while maintaining the heating and/or cooling of some or all rooms of the building according to one or more defined criteria (e.g., within a temperature range, to respond to occupant-supplied dynamic requests to increase or decrease the temperature in particular rooms at particular times, etc.).

In the illustrated example of FIG. 2D, the building has multiple floors 274, with each floor having multiple rooms 275. Some rooms have temperature sensors 276 to supply temperature for that room, and some rooms (whether the same or different rooms) may have occupant-selectable instruction boxes 277 to request heating and/or cooling for one or more rooms associated with those instruction boxes. The control agent 279 receives information from sensors for the target system (e.g., the in-room temperature sensors 276, one or more external temperature sensors, sensors associated with operation of the HVAC unit(s) 272 and/or a power supply 273 for the building, etc.), control signal information supplied from the control agent 279 to the HVAC unit(s) 272 and/or power supply 273, other information about output or results of the target system operation, and forecast parameter values of one or more types (e.g., for one or some or all of the other types of input data provided to the control agent 279) from one or more PVF forecasting models 278, etc.—while the control agent is illustrated in this example as providing instructions directly to the HVAC unit(s) and/or power supply, in other embodiments the control agent may instead supply control instructions to one or more intermediary systems (e.g., a smart building management system). The one or more PVF forecasting models 278 may similarly receive information from sensors for the target system, control signal information supplied from the control agent 279 to the HVAC unit(s) 272 and/or power supply 273, and/or other information about output or results of the target system operation, and use such information to improve operation of the forecasting model(s) 278, as discussed in greater detail elsewhere herein. It will be appreciated that activities similar to those described with respect to FIGS. 2A-2C may similarly be performed for target system 295, although such details are not illustrated here for the sake of brevity. Some further aspects of performing automated operations to control such a target system are included in U.S. patent application Ser. No. 15/410,647, filed Jan. 19, 2017 and entitled "Using Sensor Data To Assist In Controlling A Target System By Modeling The Functionality Of The Target System," which is hereby incorporated by reference in its entirety In at least some embodiments, parameter adaptation and auto-retraining for time-series forecasts is performed for the forecasting models used in a forecasting component (also referred to as a "forecaster" at times herein). As one non-exclusive example, the forecaster may make predictions for a linear system that is modeled by the following equations:

$$x_n = Ax_{n-1} + Bu_{n-1} + w_{n-1} \tag{0.1}$$

$$y_n = Cx_n + v_n \tag{0.2}$$

where
$x_n$ is the state of the system (note that this may not be directly observed)
$u_n$ is a control (or some input variable that not being predicted)
$w_n$ is noise in the process
$y_n$ is the measured data $v_n$ is the measurement noise A is the state transition matrix that determines how the previous state affects the new state B is the input matrix that determines how the previous control affects the new state C is the output matrix that determines how the measurement is related to the state This general framework allows multiple different types of models, as discussed elsewhere herein. If A is 0, then this becomes a plain regression, not an autoregression model. If C is the identity matrix and $v_n$ is 0, then there is no difference between the observations and the state.

In addition, multiple points may be predicted at once by stacking x's into a larger vector; e.g., to predict hourly prices for a full day, the state is not a single price, but consists of 24 prices, one for each hour of the day. The structure of the matrix A determines the relation between each of the times; typical choices may be a full matrix, a tridiagonal matrix, a diagonal matrix, or a constant times the identity. Higher order models may be handled by (further) stacking the x's into even larger vectors and making larger block matrices for A and B. For example, the third order model $$x_n = A_1 x_{n-2} + A_2 x_{n-2} + A_3 x_{n-3} \quad (0.3)$$

can be written as a first order model as:

$$\begin{bmatrix} x_n \\ x_{n-1} \\ x_{n-2} \end{bmatrix} = \begin{bmatrix} A_1 & A_2 & A_3 \\ I & 0 & 0 \\ 0 & I & 0 \end{bmatrix} \begin{bmatrix} x_{n-1} \\ x_{n-2} \\ x_{n-3} \end{bmatrix} \quad (0.4)$$

Note that different order models are possible for the state and the control. Finally, the structure of each block may be specified (e.g., $A_1$ may be full and $A_2$ may be a diagonal matrix). Additionally, data may be pre-processed before use of the above model, which allows for more general behavior. Examples include the following:

Normalize each coordinate of x so that values have mean 0, variance 1

Take a log scale (for positive data)

Normalize using Median Absolute Deviation (for robustness against outliers)

For data with known time-periods, normalize based on the time; for example, if data is arriving daily, then normalize weekends separately from weekdays. Or, if data is arriving hourly, normalize each hour of the day separately to account for periodic trends throughout the day.

All of the above may be taken into account when specifying a forecaster. A sample JSON configuration file that specifies everything is shown below:

```
{
    "samplesPerStep":24,
    "normalizer":{
        "stateNormalizers":[ "LogDowHourMad", "DowHourMad" ],
        "controlNormalizers":[ "DowHourMad" ]
    },
    "models":[
        {
            "name":"price",
            "modelType":"ConstDiagonal",
            "stateOrder":2,
            "controlOrder":1,
            "stateTerms":[ 1, 0, 1, 1 ],
            "controlTerms":[ 1 ]
        },
        {
            "name":"demand",
            "modelType":"ConstDiagonal",
            "stateOrder":2,
            "controlOrder":1,
            "stateTerms":[ 0, 1, 1, 1 ],
            "controlTerms":[ 1 ]
        }
    ],
    "forecaster": "RegressorForecaster",
    "errorFunction": "MeanAbsoluteError"
}
```

The "samplesPerStep" indicates that 24 values are being predicted at once. The normalizer section describes what normalizers to use for each input state and control variable. The matrix A is determined in the "model" section, has a block structure that is built up in code to the full matrix. The parameters "stateOrder" and "controlOrder" define the order of model to use for each variable; "modelType" specifies the type of structure each block, and the "stateTerms" and "controlTerms" indicate the block pattern. Finally, there are parameters to specify the type of forecaster to use, and what error to use during training.

As one example of forecasting future demand for electrical power to be supplied from the one or more batteries and forecasting future prices of such power to be supplied from or to the batteries, the electricity price and the power demand may in some embodiments be predicted for each hour of the day, given past prices, demands and forecasted temperature. Such predicting may use, for example, a model in which $p_n$ is the 1×24 vector of prices for each hour of day n, and $d_n$ is the 1×24 vector of demands for each hour of day n, and $t_n$ is the 1×24 vector of the temperatures for each hour of day n. The second order process model below may be used, $$p_n = c_1 p_{n-1} + c_2 p_{n-2} + c_3 d_{n-1} + c_4 t_n \quad (0.5)$$

$$d_n = c_5 p_{n-1} + c_6 d_{n-1} + c_7 d_{n-2} + c_8 t_n \quad (0.6)$$

which may be written as:

$$\begin{bmatrix} p_n \\ d_n \\ p_{n-1} \\ d_{n-1} \end{bmatrix} = \begin{bmatrix} c_1 I & c_3 I & c_2 I & 0 \\ c_5 I & c_6 I & 0 & c_7 I \\ I & 0 & 0 & 0 \\ 0 & I & 0 & 0 \end{bmatrix} \begin{bmatrix} p_{n-1} \\ d_{n-1} \\ p_{n-2} \\ d_{n-2} \end{bmatrix} + \begin{bmatrix} c_4 I \\ c_8 I \\ 0 \\ 0 \end{bmatrix} t_n \quad (0.7)$$

where I is the 24×24 identity matrix, and 0 is the 24×24 zero matrix. In this model, there is no difference between the internal state $(p_n, d_n)$ and the measurements, so the measurement equation is:

$$\begin{bmatrix} p_n \\ d_n \end{bmatrix} = \begin{bmatrix} I & 0 & 0 & 0 \\ 0 & I & 0 & 0 \end{bmatrix} \begin{bmatrix} p_n \\ d_n \\ p_{n-1} \\ d_{n-1} \end{bmatrix} \quad (0.8)$$

In this example, the predicted weather forecast is used in order to make predictions, but observed weather is used in order to train the models. Demands and temperatures are normalized in this example by subtracting the median and dividing by the mean absolute deviation, where data is grouped separately for the different 24*7 combinations of hour per day and day per week. Similarly, prices are normalized by first taking the logarithm, then subtracting the median and dividing by the mean absolute deviation, grouped by each hour and day of week combination. The operations to implement this functionality may, for example, be implemented as a set of asynchronous jobs, as follows: data extraction (e.g., have four jobs that run daily to extract historic prices, historic demands, historic temperatures, and predicted temperatures from various websites, and save results in shared storage); model training (e.g., have a job that trains new models 3 times a week, and subsequently trigger a job to do model comparison and select the best model and remove the worst models); and forecasting/predictions (e.g., have a 'driver' program that runs daily and takes the latest best model and makes predictions for the next week, and provides the results, such as by serving them to users, publishing them to subscribers, etc.). The data flow between the different jobs is shown in diagram 290 of FIG. 2C. Since predictions are made for up to a week in advance, the system is robust in case something breaks—e.g., if a data source becomes temporarily unavailable, then the user can still get results for several days while the problem is fixed.

Other examples of forecasting future demand for electrical power to be supplied from the one or more batteries and forecasting future prices of such power to be supplied from or to the batteries may include doing so at 5-minute intervals for the next hour, given past prices, demands and forecasted temperature. Such predicting may use, for example, a model in which $p_n$, $d_n$ and $t_n$ are 1×12 vectors of prices, demands, and temperatures for each 5-minute interval of day n. In the case the temperature is not available this frequently, 5-minute temperature values may be interpolated from longer time frame (e.g., hourly) temperatures. The first order process model as follows may be used:

$$\begin{bmatrix} p_n \\ d_n \end{bmatrix} = \begin{bmatrix} c_1 & c_2 \\ c_3 & c_4 \end{bmatrix} \begin{bmatrix} p_{n-1} \\ d_{n-1} \end{bmatrix} + \begin{bmatrix} c_3 \\ c_6 \end{bmatrix} t_n \quad (0.9)$$

and the following measurement model is:

$$\begin{bmatrix} p_n \\ d_n \end{bmatrix} = \begin{bmatrix} 1 & 0 \\ 0 & 1 \end{bmatrix} \begin{bmatrix} p_n \\ d_n \end{bmatrix} \quad (0.10)$$

Again, the predicted weather is used to make predictions, and past observed weather is used to train models. To normalize temperatures and demands, the mean may be subtracted and divided by the mean absolute deviation; for prices, the log may be taken, and then subtract the mean and divide by the mean absolute deviation. The implementation of this is similar to the Hour-Day prediction discussed above, but the data source for price/demand may be, for example, a direct feed rather than, for example, scraping a Web page.

A forecasting model may be trained and/or updated in various manners in various embodiments. As one non-exclusive example, historical data may be available on which to initially train a model, after which the model can run "online" as new data comes in. For example, suppose 100 historical values $(x_1,u_1), (x_2,u_2), \ldots, (x_{100},u_{100})$ are available. The first 50 of them, for example, may be reserved to estimate the initial values of the parameters A, B, C. Then the remaining 50 points may be compared with the predictions that the trained model generates to measure how well the model performs for that future data. Note as the model is run forward from time 50 to time 100 in this example, the parameters A, B, C may change when using any of the dynamic models above. The final model may be used to predict future points; every time a new measurement occurs, the model may update itself. This is typically computationally cheap, and may be done in real time in at least some embodiments.

If a particular forecasting model is used over time, it is possible that its performance will decay as the data changes over time, particularly for non-dynamic (or 'static') models that do not update themselves with new measured data. However, it can also occur for dynamic models—for example, a few very bad data points can in some situations permanently skew a Kalman filter model, or numerical errors may accumulate that reduce the model's predictive power. In at least some embodiments, the following is one non-exclusive example of a system that may be used to increase the chance of having the best possible model at any given time available to be used for forecasting at that time, without manual intervention.

- Start with a pool of candidate forecasting models. Some may be simpler (e.g., a plain autoregression, or using a lower-order model), and these will tend to perform better with less training data, or if there is extra noise that could corrupt more complex models. Some may be more complex (e.g., a PAE Kalman filter) that can outperform others when a lot of data is available.
- Train these models on the last T points of historic data, reserving the last N points to measure on. Save these models before measuring, as in the process of measuring, the models update themselves to the end of the data.
- Pick the model with the highest performance, and use this for future predictions.
- Each time a new measurement comes in, update each model with one point, so that each model is always saved with N points of historical data that may be measured
- Periodically, try to find a new best model. In addition to the existing pool of models (which are trained on older data, but updated with new data), a new set of models are created as in steps 1 and 2 that are trained on just the last T points, thus producing different models trained on different amounts of data.
- Score all the models on the last N points of data. Take the best-performing model for production scoring, and optionally remove the worst performing models (e.g., if the number of models to consider is preferred to stay constant). Return to the fourth step above, involving updating each model when a new measurement comes in.

The process above is illustrated in architecture 280 of FIG. 2B.

One advantage to this example procedure is that the model being used at any given time beats other models on recent data with respect to the accuracy of its predictions, so it is robust. Further, since both simple and complex models are considered, the models considered to be best are automatically adjusted if the data becomes noisier or less predictable. Finally, since the models have been trained on different time-periods, the chances are increased that the best sets of data for training initial parameters are used in one or more of the models.

As one example embodiment with additional details regarding a PAE (Parameter Adaptation Engine), consider the following dynamical system:

$$x_n = A x_{n-1} + B u_n + w_n \quad (0.11)$$

$$y_n = x_n + v_n \quad (0.12)$$

where
$x_n$ is the state of the system (note that this may not be directly observed)
$u_n$ is a control (or some input variable that is not predicted)
$w_n$ is noise in the process; it is assumed to be zero mean, and have covariance $Q_n$
$y_n$ is the measured data
$v_n$ is the measurement noise; it is assumed to have zero mean, and covariance $R_n$
A is the state transition matrix that determines how the previous state affects the new state
B is the input matrix that determines how the previous control affects the new state
Equation (0.11) is known as the process model of the system, and (0.12) is known as the measurement model. A common method of state estimation given the measurements is a Kalman filter. Kalman filters are known, but typically have the assumption that matrices A, and B are constant. In a real-world system, the matrices A and B may change over time. Additionally, if the matrices do not match the "true" underlying system dynamics, then a Kalman filter will not perform optimally, so having a method to adapt A and B to better fit the true underlying dynamics provides benefits for the use of the described techniques. In particular, matrices A and B are allowed to change over time, and a second Kalman filter is used to update the matrices given the observations. It is possible to estimate any subset of A or B, depending on which parts are desired to remain fixed, and which parts are desired to allow to change. To do this, the (nonzero) entries of A and B are first encoded as a vector, $\psi_n$. This vector is the parameter state. The process model of the parameter system is then defined as:

$$\psi_n = \psi_{n-1} + \Theta_n \quad (0.13)$$

where $\Theta_n$ is the process noise of the parameters. A multiple of the identity may be used for this. To make the observation model of the parameter system, the measurements are written as a function of the parameter, and a measurement noise is added:

$$x_n = F_n \psi_n + l_n \quad (0.14)$$

where $l_n$ is assumed to be normally distributed with mean 0 and covariance $\Lambda$ for all time. These two equations now constitute a dynamical system to which a Kalman filter may be applied. Note that parameters are preferably updated at a slower scale than the updates to the state (for robustness) in at least some embodiments. In addition, the choices made for the parameter process noise and measurement noise may impact how the parameter adaptation behaves.

As one specific example for how to construct the dynamical equations for parameter updating, suppose the following system is used:

$$\begin{bmatrix} x_1 \\ x_2 \end{bmatrix}_n = \begin{bmatrix} a_{11} & a_{12} \\ a_{21} & a_{22} \end{bmatrix} \begin{bmatrix} x_1 \\ x_2 \end{bmatrix}_{n-1} + \begin{bmatrix} b_1 \\ b_2 \end{bmatrix} u_n + w_n \quad (0.15)$$

$$\begin{bmatrix} y_1 \\ y_2 \end{bmatrix}_n = \begin{bmatrix} x_1 \\ x_2 \end{bmatrix}_n + v_n \quad (0.16)$$

and the parameters $a_{11}, a_{12}, a_{21}, a_{22}, b_1, b_2$ are to be adapted. Here, the parameter state is the vector of parameters at each time n:

$$\psi_n = \begin{bmatrix} a_{11} \\ a_{12} \\ a_{21} \\ a_{22} \\ b_1 \\ b_2 \end{bmatrix}_n \quad (0.17)$$

To get the equation for the observation system, expand out the process equation to $$x_{1_n} = a_{11} x_{1_{n-1}} + a_{12} x_{2_{n-1}} + b_1 u_n \quad (0.18)$$

$$x_{2_n} = a_{21} x_{1_{n-1}} + a_{22} x_{2_{n-1}} + b_2 u_n \quad (0.19)$$

then, write the matrix F so that $x_n = F_n \psi_n$, as follows:

$$\begin{bmatrix} x_1 \\ x_2 \end{bmatrix}_n = \begin{bmatrix} x_{1_{n-1}} & x_{2_{n-1}} & 0 & 0 & u_n & 0 \\ 0 & 0 & x_{1_{n-1}} & x_{2_{n-1}} & 0 & u_n \end{bmatrix} \begin{bmatrix} a_{11} \\ a_{12} \\ a_{21} \\ a_{22} \\ b_1 \\ b_2 \end{bmatrix}_n \quad (0.20)$$

Resulting in $$F_n = \begin{bmatrix} x_{1_{n-1}} & x_{2_{n-1}} & 0 & 0 & u_n & 0 \\ 0 & 0 & x_{1_{n-1}} & x_{2_{n-1}} & 0 & u_n \end{bmatrix} \quad (0.21)$$

To complete the equations for the PAE Kalman filter, choose some reasonable matrices for the covariances of $\Theta$ and 1. Possible choices might be $$\text{cov}(\Theta) = 0.01 I_6 \quad (0.22)$$

$$\text{cov}(l) = \Lambda = 0.01 I_2 \quad (0.23)$$

As one example embodiment with additional details regarding performing price and demand forecasting with historical data, with data every five minutes for price, demand and weather, a Kalman filter is used for incremental price and incremental demand on a five minute time scale. And another Kalman filter is used to estimate the parameters. The price $P_t$, demand $D_t$ and weather $W_t$ are scalars and there is historical data for them. The model is on the incremental price $\Delta P_t$ and incremental demand $\Delta D_t$, are $$P_t = \overline{P}_t + \Delta P_t \quad (0.24)$$

$$D_t = \overline{D}_t + \Delta D_t \quad (0.25)$$

where the average price and average demand are taken over the last N time periods, $$\overline{P}_t = \frac{1}{N} \sum_{i=t-N}^{t} P_i \quad (0.26)$$

$$\overline{D}_t = \frac{1}{N} \sum_{i=t-N}^{t} D_i \quad (0.27)$$

There is also an update equation, as follows:

$$\bar{P}_{t+1} = \frac{1}{N+1}\sum_{i=t-N}^{t+1} P_i = \frac{1}{N+1}\left(\sum_{i=t-N}^{t} P_i + P_{t+1}\right) = \frac{N}{N+1}\bar{P}_t + \frac{1}{N+1}P_{t+1}.$$

Similarly, $$\bar{D}_{t+1} = \frac{N}{N+1}\bar{D}_t + \frac{1}{N+1}D_{t+1}$$

Another way to update the average is to use a sliding window of N time periods. The dynamic equations for the incremental model are given as $$\Delta X_{t+1} = \begin{bmatrix} \Delta P_{t+1} \\ \Delta D_{t+1} \end{bmatrix} = \begin{bmatrix} a_{11} & a_{12} \\ a_{21} & a_{22} \end{bmatrix}\begin{bmatrix} \Delta P_t \\ \Delta D_t \end{bmatrix} + \begin{bmatrix} b_1 \\ b_2 \end{bmatrix}W_t + \eta_t = \quad (0.28)$$

$$\hat{A}\Delta X_t + \hat{B}W_t + \eta_t$$

where the noise vector is Gaussian, $$\eta_t \sim N(0, Q) \text{ and } Q = \begin{bmatrix} q_1 & 0 \\ 0 & q_2 \end{bmatrix}.$$

To develop the observation equation, $$Y_t^1 = P_t + \gamma_t^1 = \bar{P}_t + \Delta P_t + \gamma_t^1 \quad (0.29)$$

yielding $$\Delta Y_t^1 = \Delta P_t + \gamma_t^1 \quad (0.30)$$

and similarly, for demand, $$Y_t^2 = D_t + \gamma_t^2 = \bar{D}_t + \Delta D_t + \gamma_t^2 \quad (0.31)$$

yielding $$\Delta Y_t^2 = \Delta D_t + \gamma_t^2 \quad (0.32)$$

where the observation noise is Gaussian, $$\gamma_t \sim N(0, R) \text{ and } R = \begin{bmatrix} r_1 & 0 \\ 0 & r_2 \end{bmatrix}$$

and w the observation noise for price and demand are assumed to be uncorrelated. To summarize, the incremental price and demand model for the Kalman filter is $$\Delta X_{t+1} = \hat{A}\Delta X_t + \hat{B}W_t + \eta_t \quad (0.33)$$

$$\Delta Y_t = \Delta X_t + \gamma_t \quad (0.34)$$

where $\hat{A}$ and $\hat{B}$ are estimates of the parameters from the second Kalman filter. The Kalman filter equations follow. The predictor equation is $$\Delta X_{t+1|t} = \hat{A}\Delta X_{t|t} + \hat{B}W_t \quad (0.35)$$

and the corrector equation is $$\Delta X_{t+1|t+1} = \Delta X_{t+1|t} + K_t^{gain}(\Delta Y_t - \Delta X_{t+1|t}) \quad (0.36)$$

where $K_t^{gain}$ is the gain matrix. The covariance matrix for the Kalman filter, denoted E, is computed by the predictor equation, $$\Sigma_{t+1|t} = \hat{A}\Sigma_{t|t}\hat{A}^T + Q \quad (0.37)$$

and the corrector equation, $$\Sigma_{t+1|t+1} = [1 - K_t^{gain}]\Sigma_{t+1|t}, \quad (0.38)$$

The gain is $$K_t^{gain} = \Sigma_{t+1|t}(\Sigma_{t+1|t} + R)^{-1}\Sigma_{t+1|t}, \quad (0.39)$$

The initial condition is $$\Sigma_{0|0} = \Sigma_0 \quad (0.40)$$

The gain matrix involves a matrix inverse, but there is a way to propagate the inverse instead of having to take the inverse directly. The vector of the six parameters of the model vect($a_{11}$, $a_{12}$, $a_{21}$, $a_{22}$, $b_1$, $b_2$) is assumed to change slower than the price and demand states, so historical price and demand data are used in a Kalman filter for the parameters. The parameters are updated at a rate substantially slower than the process dynamics updates. Let $$\psi_t = \text{vect}(a_{11}, a_{12}, a_{21}, a_{22}, b_1, b_2)_t \quad (0.41)$$

and the dynamics of the parameters is, $$\psi_{t+1} = \psi_t + \Theta_t \quad (0.42)$$

where $\Theta_t$ is $N(0,\lambda)$. The parameter observation equation is as follows, which is derived from (0.28), as, $$\begin{bmatrix} \Delta P_t \\ \Delta D_t \\ \Delta P_{t-1} \\ \Delta D_{t-1} \\ \Delta P_{t-2} \\ \Delta D_{t-2} \end{bmatrix} = \quad (0.43)$$

$$\begin{bmatrix} \Delta P_{t-1} & \Delta D_{t-1} & 0 & 0 & W_{t-1} & 0 \\ 0 & 0 & \Delta P_{t-1} & \Delta D_{t-1} & 0 & W_{t-1} \\ \Delta P_{t-2} & \Delta D_{t-2} & 0 & 0 & W_{t-2} & 0 \\ 0 & 0 & \Delta P_{t-2} & \Delta D_{t-2} & 0 & W_{t-2} \\ \Delta P_{t-3} & \Delta D_{t-3} & 0 & 0 & W_{t-3} & 0 \\ 0 & 0 & \Delta P_{t-3} & \Delta D_{t-3} & 0 & W_{t-3} \end{bmatrix}\begin{bmatrix} a_{11} \\ a_{12} \\ a_{21} \\ a_{22} \\ b_1 \\ b_2 \end{bmatrix} + \Theta_t$$

and the noise process is $N(0,\Lambda)$, for all t. Now a Kalman filter is used to estimate the parameters.

The described techniques may provide a variety of benefits and advantages. Non-exclusive examples of such benefits and advantages include improving how forecasting of future parameters is performed, such as by combining the use of multiple different types of forecasting models and multiple different groups of past data to use for training the models, and/or by improving the estimated internal non-observable state information reflected in at least some of the models. In addition, by forecasting future values of parameters that affect operation of a target system, and using the forecasted future values as part of determining current automated control actions to take for the target system, the current automated control actions may be optimized or otherwise improved relative to other possible actions that do not reflect such forecasted future values.

In addition, with respect to the embodiments in which power output of a battery is controlled on the DC side (e.g., by varying DC current and voltage of the battery), further such non-exclusive benefits include allowing the battery to operate in its optimal or near-optimal physical state with respect to internal temperature and/or other battery parameters (e.g., by maintaining an internal chemistry of the battery within one or more chemical stoichiometric limits, such as a stoichiometric range), rather than fixing AC (alternating current) voltage and/or current being provided by an inverter connected to the battery at a single specified level, and forcing the battery to operate at a saturation level that provides maximum power but at the cost of possible non-reversible battery damage—in this manner, battery longevity and other operational performance may be optimized or otherwise enhanced by the described techniques, by allowing the battery to operate in a preferred range in which battery chemistry changes are reversible and in which short-circuits and other non-reversible damage is reduced or eliminated, in light of forecasted future data of one or more types related to power. In addition, in at least some embodiments, the automated control of the battery may further include active control of the battery to enhance and maintain power output amount resonance with the other components (e.g., a load and/or an external power grid), such that the amount of power provided does not exceed what is needed, while also satisfying at least a defined percentage or other amount of power output requests or load amounts (e.g., 50%, 65%, 100% or any other defined percentage or other amount). In this manner, such embodiments may be conceptualized as an automated control system to manage the internal state and operational performance (including longevity) of a battery being controlled, while satisfying power output requests if possible and managing forecasted future power-related data, rather than existing systems that fix the output voltage or current of a battery and fulfill all power requests even if it causes battery damage or other problems (e.g., excessive heating). While the benefits and operations discussed above and in some other locations herein relate to controlling power being output from a battery, it will be appreciated that the same techniques may be used to control power being stored into a battery from one or more sources, so as to cause the battery to operate in its optimal or near-optimal physical state with respect to heat and other battery parameters while storing power, and to optimize or otherwise enhance battery longevity and other operational performance by allowing the battery to operate in a preferred range in which battery chemistry changes are reversible, while satisfying at least a defined percentage or other amount of power input requests (e.g., 50%, 65%, 100% or any other defined percentage or other amount) for power being supplied by one or more sources, while managing forecasted future power-related data. Additional benefits and advantages include the following, with the term 'optimizing' a feature or result as used herein meaning generally improving that feature or result (e.g., via partial or full optimization), and with the term 'real-time' as used herein meaning with respect to a time frame (e.g., fractions of a second, seconds, minutes, etc.) specific to a resulting component or system being controlled, unless otherwise indicated:

can improve battery lifetime by optimizing DC control variables, such as I (current), V (voltage) and R (amount of power being output)

can improve battery lifetime by optimizing DC control variables (I, V, R) in conjunction with a prior characterization of battery chemistry, and can optimize at DC level to improve performance and longevity can optimize variables in real-time in DC domain to solve for objectives in AC phase can optimize AC output in real-time to match grid frequency resulting in resonant operation, such as via control of only battery output and no other grid components can improve charge/discharge cycles to improve long-term battery availability can improve AC load response can improve AC load response in combination with improving long-term battery availability battery controller can run as embedded software on a processor in a self-sufficient manner battery controller can be monitored and updated continuously from external location (e.g., the cloud or other network-accessible location)

battery controller can transmit battery characteristics to improve performance can avoid expenses of static bar compensator hardware Various other benefits and advantages may be further realized in at least some embodiments, as discussed in part in greater detail below.

Figure 3:
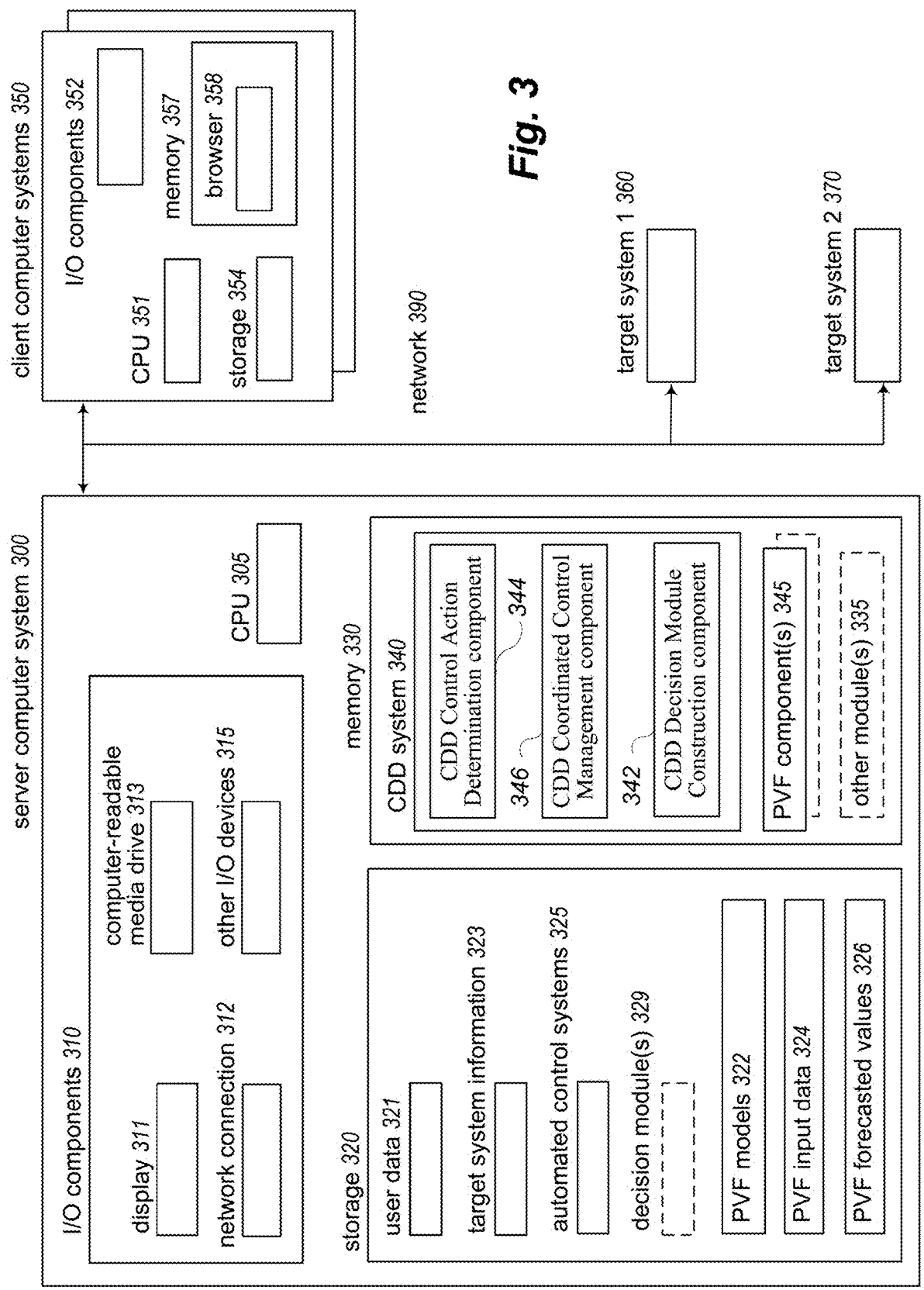
FIG. 3 is a block diagram illustrating example computing systems suitable for executing an embodiment of a system for performing cooperative distributed control of target systems in configured manners.

FIG. 3 is a block diagram illustrating example computing systems suitable for performing techniques for implementing automated control systems to control or otherwise manipulate at least some operations of specified physical systems or other target systems in configured manners based at least in part on forecasted data (e.g., to control physical target systems having one or more batteries by using characteristics of each battery's state to perform automated control of DC power that is provided from the battery, such as in a real-time manner and to optimize long-term operation of the battery), as discussed in greater detail elsewhere herein.

In particular, FIG. 3 illustrates a server computing system 300 suitable for providing at least some functionality of a CDD system and/or one or more PVF components, although in other embodiments multiple computing systems may be used for the execution (e.g., to have distinct computing systems executing the CDD Decision Module Construction component for initial configuration and setup before run-time control occurs, and one or more copies of the CDD Control Action Determination component 344 and/or the CDD Coordinated Control Managements component 346 for the actual run-time control; to have one or more computing systems executing the PVF components that are separate from one or more other computing systems executing some or all of a CDD system with which the PVF components interact; to have different computing systems executing different PVF components; etc.). FIG. 3 also illustrates various client computer systems 350 that may be used by customers or other users of the CDD system 340, as well as one or more target systems to be controlled (in this example, target system 1 360 and target system 2 370, which are accessible to the CDD system 340 and/or the PVF components 345 over one or more computer networks 390).

In the illustrated embodiment, one or more PVF components 345 are executing in memory 330, and in some embodiments the component(s) each includes various software instructions that when executed program one or more of the CPU processors 305 to provide an embodiment of a PVF component as described elsewhere herein. During operation, each PVF component uses one or more forecasting models (e.g., in-memory copies of PVF models 322 stored on storage 320), obtains various input data 324, and produces various forecasted values 326, as discussed in greater detail elsewhere herein. In this example embodiment, at least some of the forecasted values 326 are then made available to the CDD system 340, such as for use in making determinations about automated control actions to perform.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, but such computing systems and components are not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 34690 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340 for use in controlling one or more physical target systems with batteries) or other decision modules 329, as well as to perform various other types of actions, as discussed in greater detail elsewhere. Various information related to the functionality of the CDD system 340 may be stored in storage 320, such as information 321 related to users of the CDD system (e.g., account information), and information 323 related to one or more target systems that have batteries to be controlled.

Thus, generated decision modules of the CDD system and generated PVF forecasting models (including corresponding PVF components that apply those models) may be deployed to control automated operations of one or more target systems, such as one or both of target systems 360 and 370. While not illustrated in FIG. 3, information from such use of the generated decision modules and/or generated PVF forecasting models with one or more target systems may further be provided back to the CDD system 340 and/or PVF component(s) 345, such as to allow improvements to the generated decision modules (and their internal models) and/or to the generated PVF forecasting models (and any corresponding PVF components that apply those models) that are incorporated in ongoing operations for controlling the respective target systems. For example, with respect to the generated PVF forecasting models (and any corresponding PVF components that apply those models), information from such ongoing operations (e.g., state information, control signals, other inputs, etc.) may be used to retrain such forecasting models and/or to improve estimated internal non-observable state information reflected in the forecasting models, with revised versions of one or more such forecasting models subsequently deployed and used.

As part of implementing an automated control system for a particular target system, an embodiment of a Collaborative Distributed Decision (CDD) system may use the described techniques to perform various automated activities involved in constructing and implementing the automated control system, including one or more CDI agents (also referred to as a CDD decision module or system, or a portion of such module or system) for use in controlling particular target systems.

In particular, the CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Determination component of each decision module to optimize or otherwise enhance the control actions that the decision module generates, and/or one or more Coordinated Control Management components to coordinate the control actions of multiple decision modules that are collectively performing the control of the target system.

As noted above, a Collaborative Distributed Decision (CDD) system may in some embodiments use at least some of the described techniques to perform various automated activities involved in constructing and implementing a automated control system for a specified target system, such as to modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules to use in performing the control of the target system. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Determination component of each decision module (or of some decision modules) to optimize or otherwise determine and improve the control actions that the decision module generates. For example, such a Control Action Determination component in a decision module may in some embodiments attempt to automatically determine the decision module's control actions for a particular time to reflect a near-optimal solution with respect to or one more goals and in light of a model of the decision module for the target system that has multiple inter-related constraints—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Control Action Determination component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules, components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the PVF components 345, the CDD system 340 and/or the CDD components 342-346) and/or data structures (e.g., forecasting models 322), such as by execution of software instructions of the one or more software programs and/or by storage of such software instructions and/or data structures. Furthermore, in some embodiments, some or all of the systems, modules and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
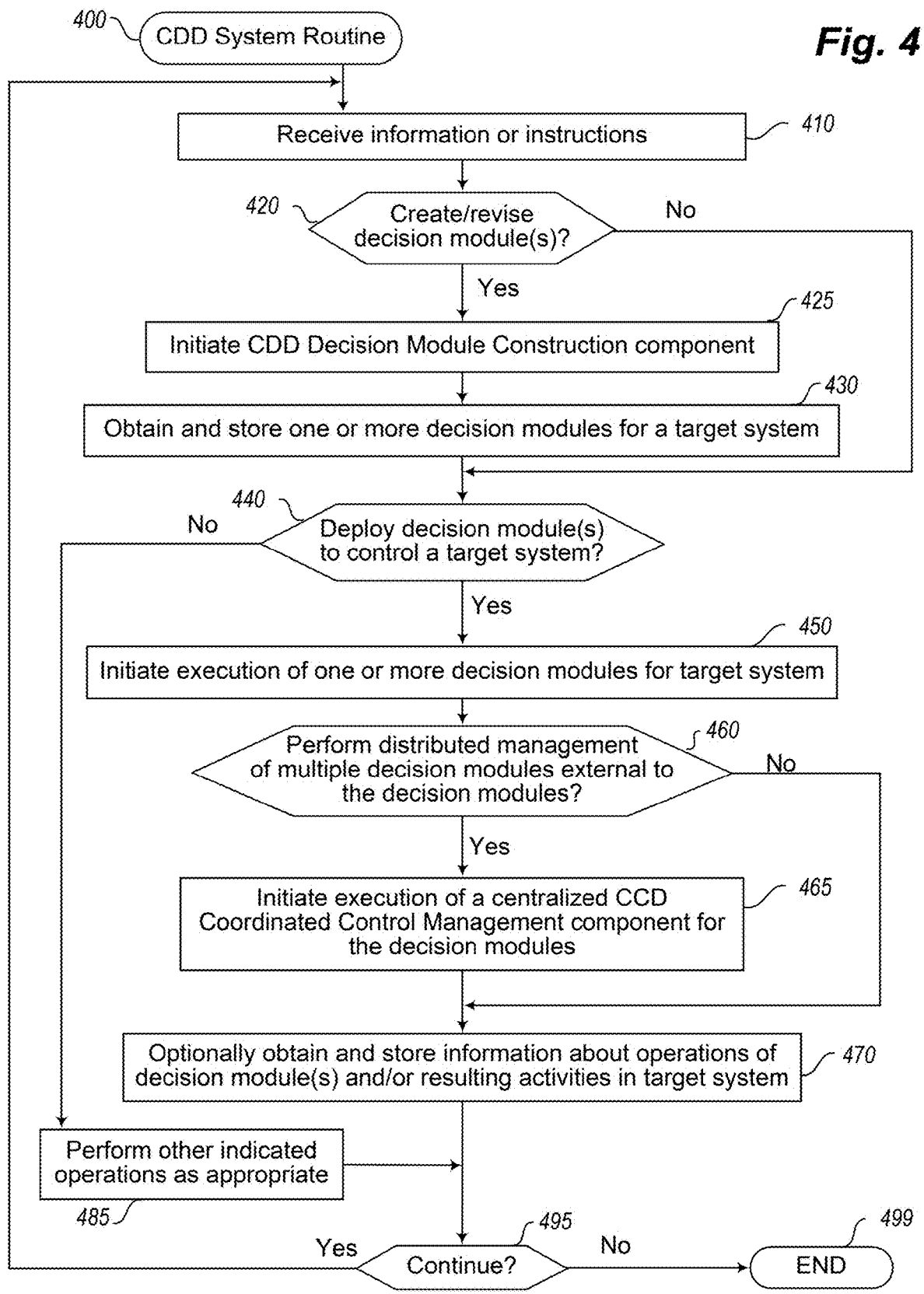
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1A, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5C.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are part of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system).

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
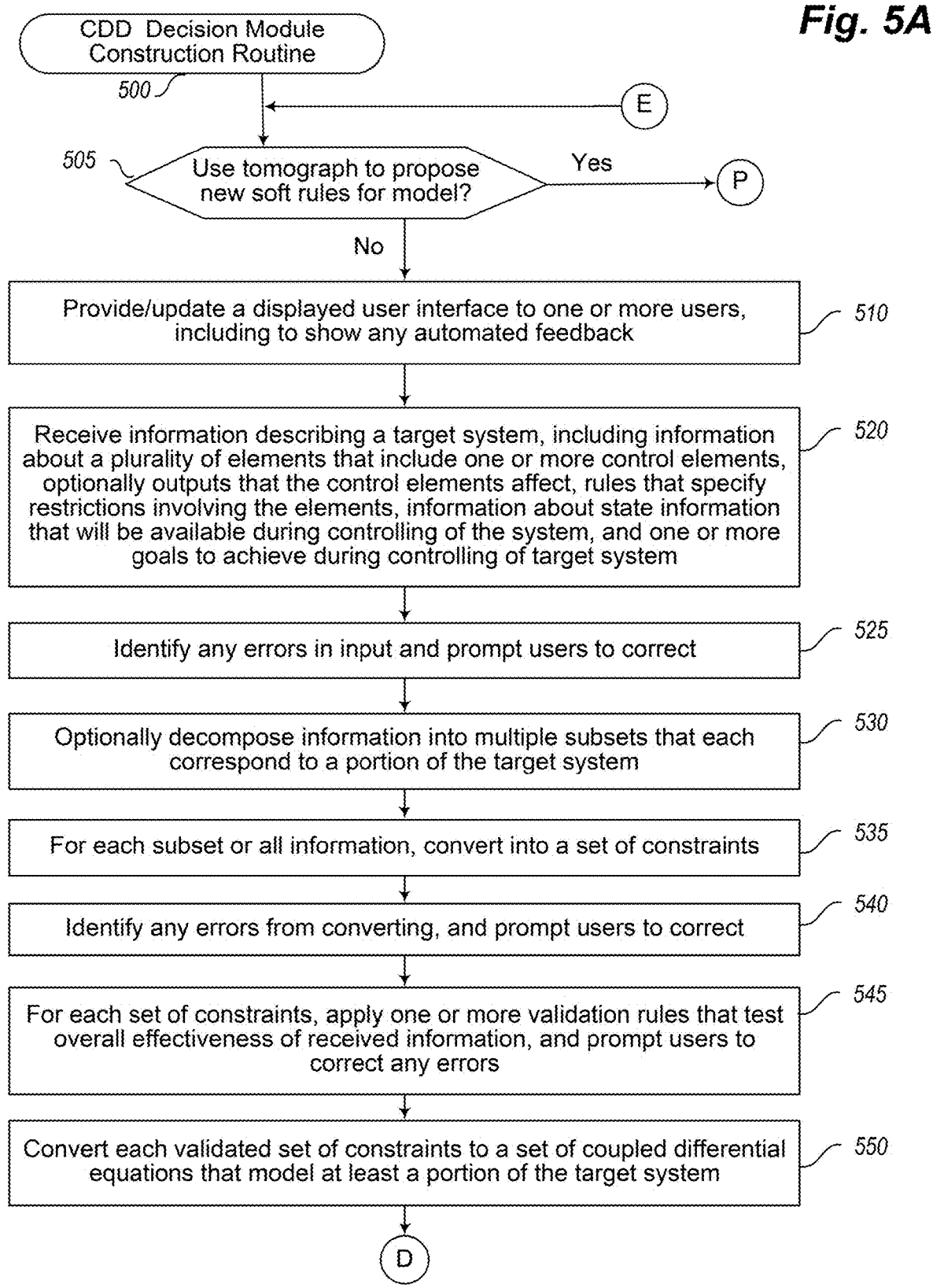
FIGS. 5A-5C illustrate a flow diagram of an example embodiment of a CDD Decision Module Construction routine.
Figure 5B:
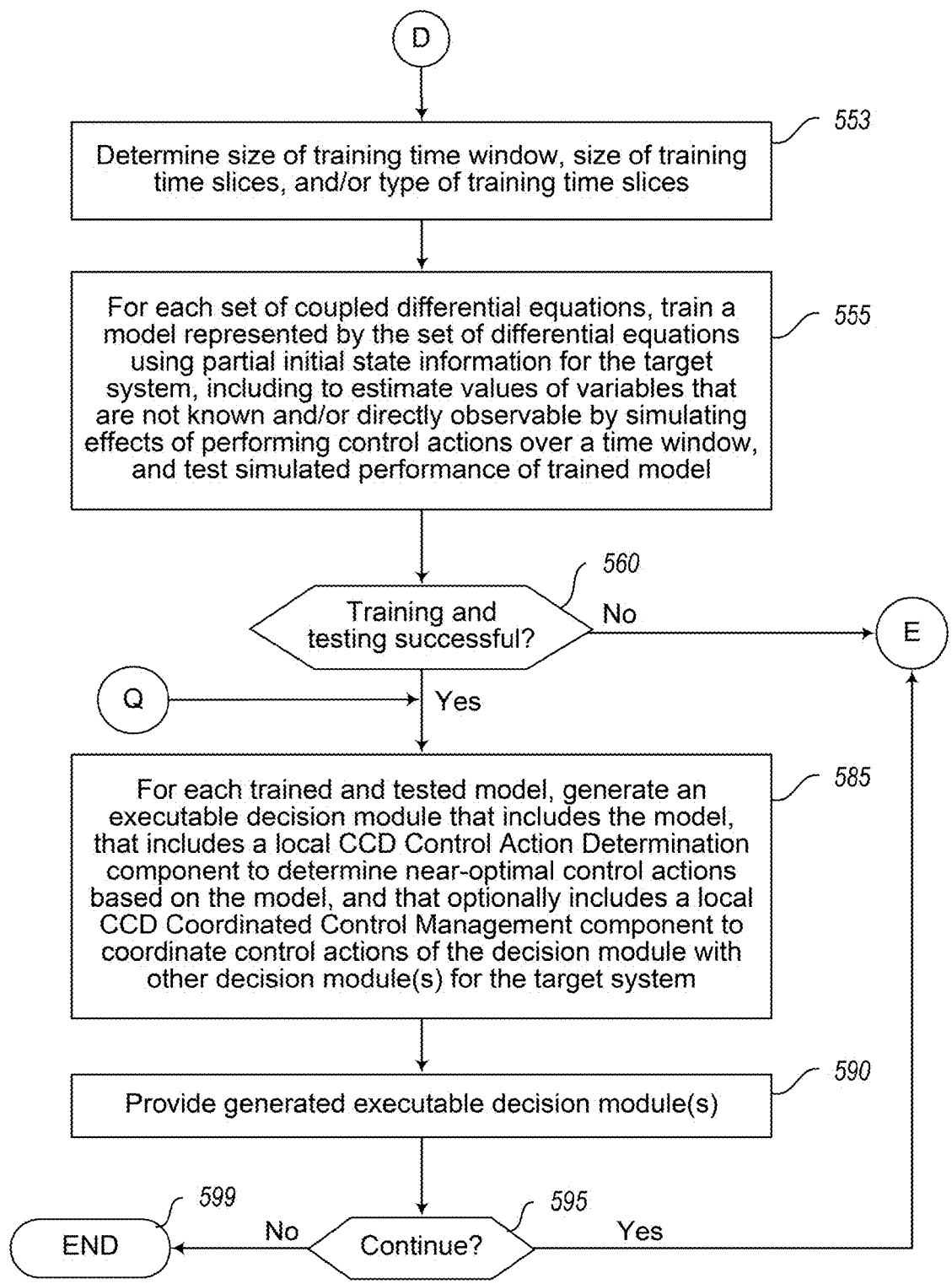
Figure 5C:
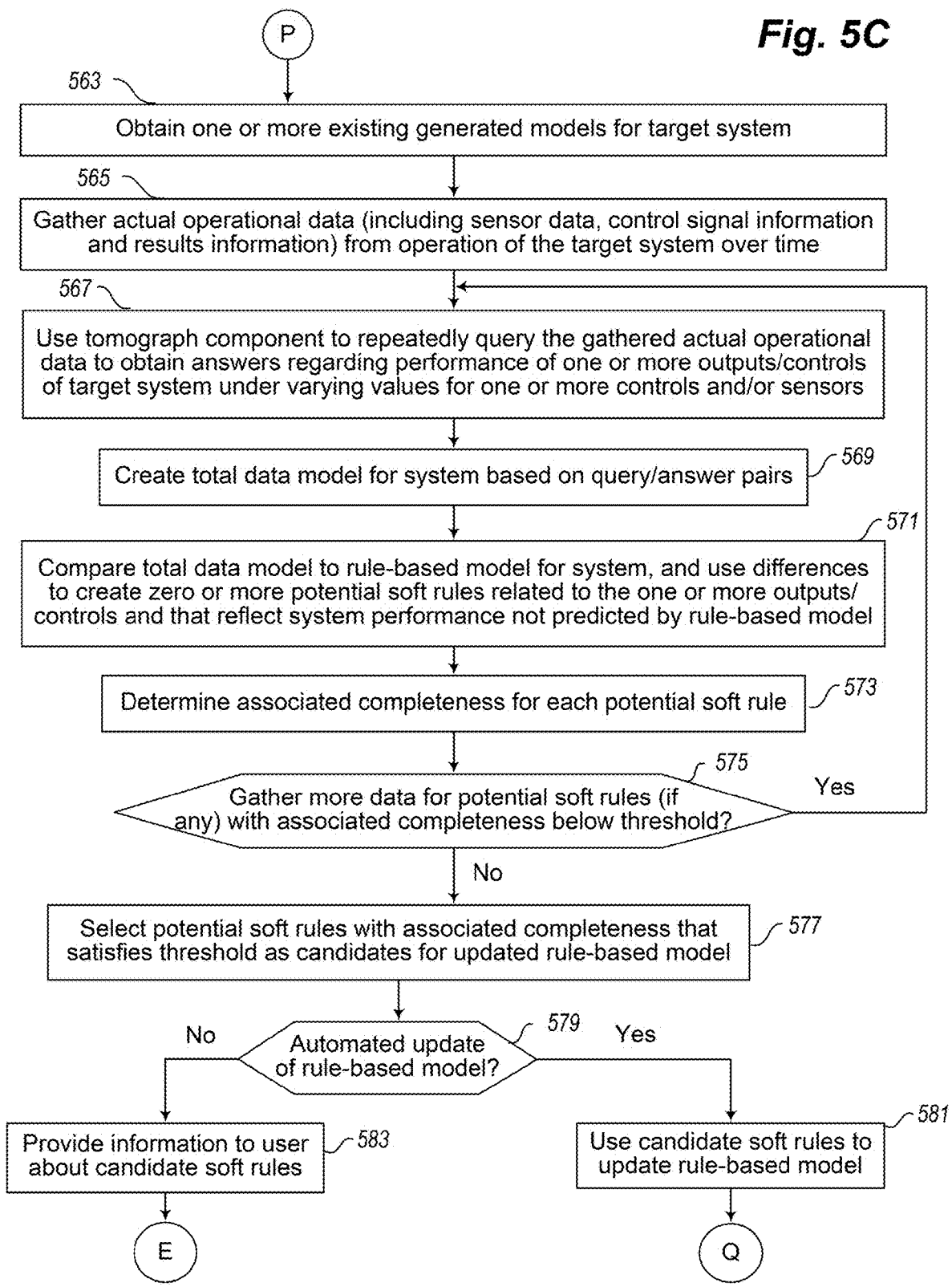

FIGS. 5A-5C illustrate a flow diagram of an example embodiment of a CDD Decision Module Construction routine 500. The routine may, for example, be provided by execution of the component 342 of FIG. 3 and/or the component 142 of FIG. 1A, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

Figure 6A:
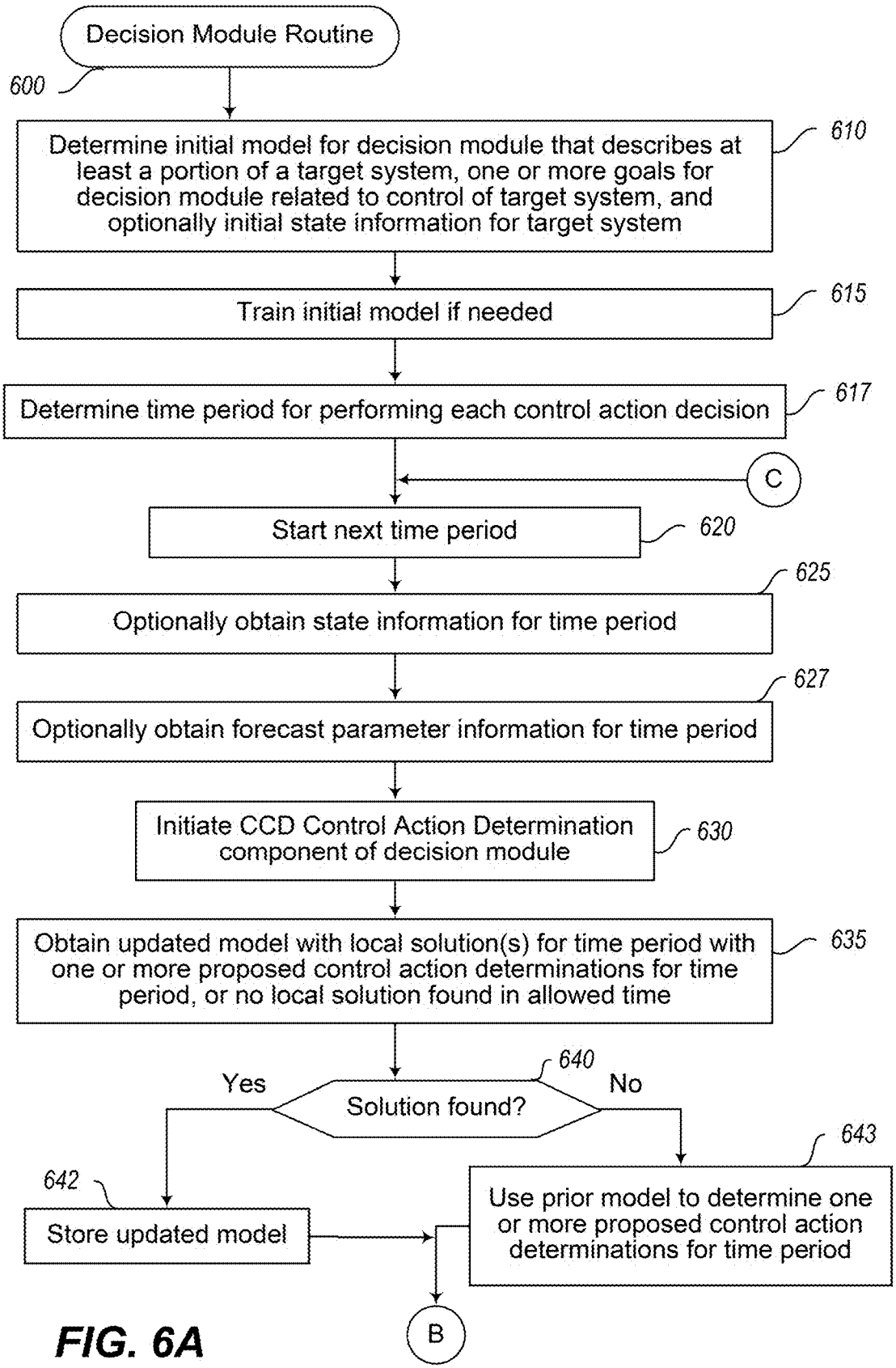
FIGS. 6A-6B illustrate a flow diagram of an example embodiment of a decision module routine.
Figure 6B:
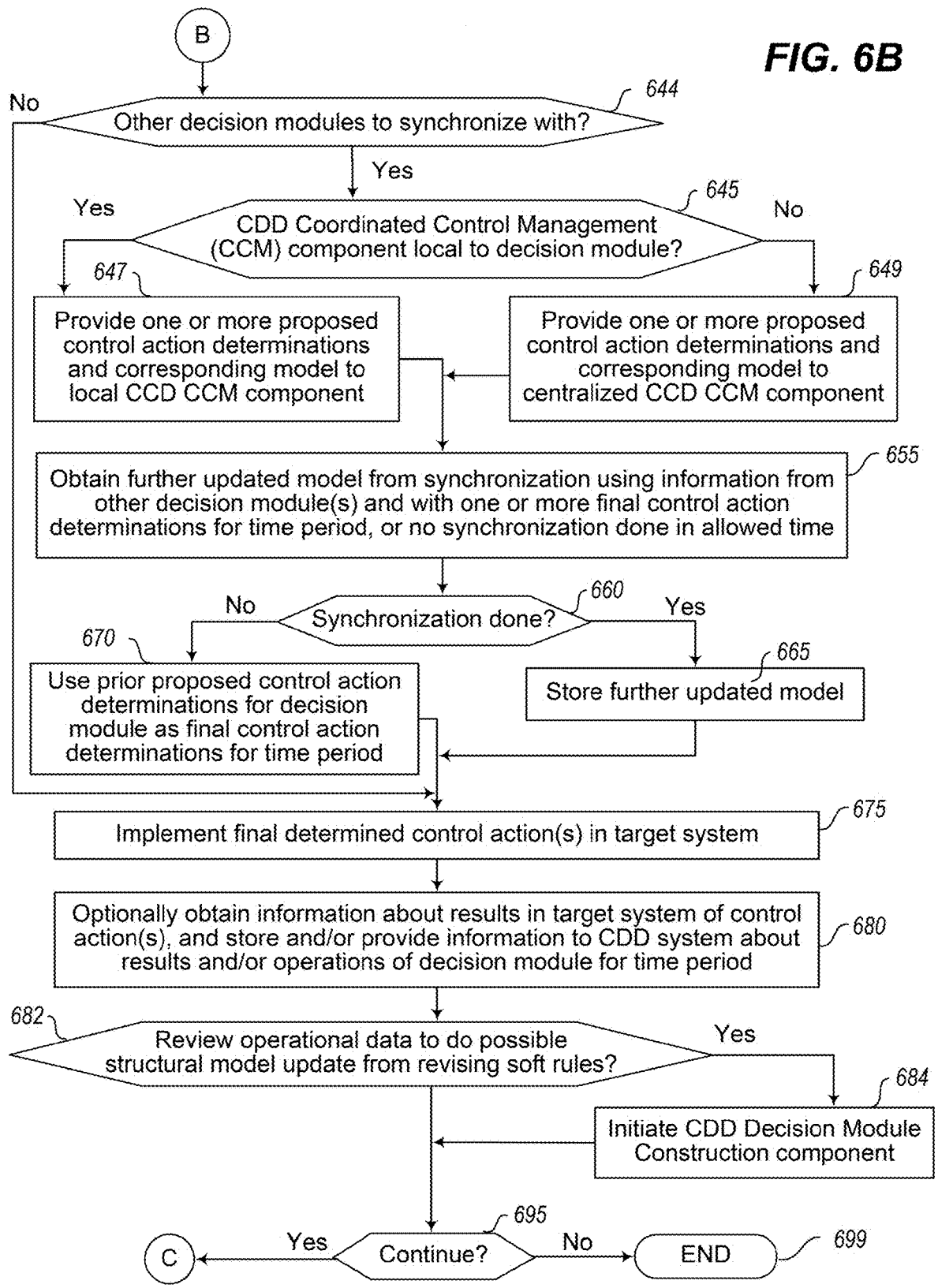

The illustrated embodiment of the routine 500 begins at block 505, where the routine determines whether to currently use a data tomograph component to learn new soft rules for potential addition to a model of a target system, such as periodically, in response to one or more triggering conditions being satisfied, based on being invoked by block 684 of FIG. 6B, etc. If so, the routine continues to block 563 of FIG. 5C, and otherwise continues to block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. The errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information for the target system, including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not returns to block 510 to display corresponding feedback information to the users to allow them to correct errors that caused the lack of success. If it is instead determined in block 560 that the testing and training were successful, however, or after block 581 of FIG. 5C with a model updated with one or more learned soft rules, the routine continues instead to block 585 to generate an executable decision module for each trained and tested model that includes that model, as well as a local CCD Control Action Determination component that the decision module will use when executed to determine optimal or near-optimal control actions to perform for the target system based on the information included in the model, and in light of the one or more goals for that decision module. The generated executable decision module may in some embodiments and situations further include a local CCD Coordinated Control Management component to coordinate control actions of multiple decision modules that collectively will provide an automated control system for the target system, such as by synchronizing respective models of the various decision modules over time. After block 585, the routine continues to block 590 to provide the generated executable decision modules for use, including to optionally store them for later execution and/or deployment.

It if was determined in block 505 to use a data tomograph component to learn new soft rules for potential addition to a model of a target system, the routine continues to block 563 of FIG. 5C, where one or more existing generated models (e.g., an initial model based on binary rules) for the target system are obtained. In block 565, the routine then gathers actual operational data from operation of the target system over time (e.g., as controlled by the one or more existing generated models), such as to retrieve previously generated and stored data from storage, to enter a data-gathering stage that continues until a specified amount of data is available, etc. After block 565, the routine continues to block 567 to use the data tomograph component to repeatedly query a data model from the gathered data to obtain answers regarding performance of the target system under varying situations and values for one or more sensors and/or controls, such as with respect to one or more outputs of the target system corresponding to a specified goal to achieve. In block 569, the routine then creates a total data model for the system based on the query/answer pairs, such as to construct a total Hamiltonian function. In block 571, the routine then obtains a rule-based model for the system (e.g., a rule-based Hamiltonian function), and compares the total model and rule-based model in order to identify any differences, which are then use to create zero or more potential soft rules related to the queries.

In block 573, the routine then determines an associated completeness value for each such potential soft rule, such as based on whether the execution of blocks 565 through 571 continue to produce new information with respect to the potential soft rules. If any such potential soft rules are not sufficiently complete (e.g., have completeness values below an associated threshold), the routine returns to block 567 to perform additional queries, and otherwise continues to block 577 to select any of the potential soft rules that are sufficiently complete as candidates to use in an improved updated model for the target system. In block 579, the routine then determines whether to automatically update an existing model, and if so continues to block 581 to use the learned candidate soft rule(s) to update an existing rule-based model, before continuing to block 585. Otherwise, the routine continues to block 583 to provide information about the learned candidate soft rule(s) to one or more users associated with the existing models and/or target system, such as to enable the user(s) to decide whether or not to use them to update an existing rule-based model, before continuing to block 505 (e.g., to receive further instructions from the user for such an update with respect to block 520.

After block 590, the routine continues to block 595 to determine whether to continue, such as until an explicit indication to terminate is received. If it is determined to continue, the routine returns to block 510, and otherwise continues to block 599 and ends.

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3 and/or a decision module 124 or 128 of FIG. 1A or 1B, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5C.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5C—in some embodiments and situations, such training for block 615 is performed only if initial training is not done by the routine 500 of FIGS. 5A-5C, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIGS. 7A-7B as initiated by block 630.

After block 615, the routine continues to block 617 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a loop for each such time period going forward until execution of the decision module is suspended or terminated, although in other embodiments a particular decision module may execute for only a single time period each time that it is executed.

In block 625, the routine optionally obtains state information for the time period, such as current state information that has been received for the target system or one or more related external sources since the last time period began, and/or by actively retrieving current values of one or more elements of the target system or corresponding variables as needed. In block 627, the routine then optionally obtains forecast information for the time period for one or more parameters of the target system, such as if one or more forecasting models are available to provide such forecast information dynamically or if have previously forecast such information for the time period. In block 630, the routine then initiates execution of a local CCD Control Action Determination component of the decision module, with one example of such a routine discussed in greater detail with respect to routine 700 of FIGS. 7A-7B, including providing information (if any) obtained in blocks 625 and/or 627. In block 635, the results of the execution of the component in block 630 are received, including to either obtain an updated model for the decision module with a local solution for the current time period and decision module that includes one or more proposed control action determinations that the decision module may perform for the current time period, or to receive an indication that no local solution was found for the decision module in the allowed time for the execution of the component in block 630. It is then determined in block 640 whether a solution was found, and if so continues to block 642 to store the updated model for the decision module, and otherwise continues to block 643 to use the prior model for the decision module to determine one or more control action determinations that are proposed for the current time period based on a previous model (e.g., that does not reflect recent changes in state information and/or recent changes in activities of other decision modules, if any), as discussed in greater detail with respect to routine 700 of FIGS. 7A-7B.

After blocks 642 or 643, the routine continues to block 644 to determine if other decision modules are collectively controlling portions of the current target system, such as part of the same automated control system as the local decision module, and if so continues to block 645. Otherwise, the routine selects the local proposed control actions of the decision module as a final determined control action to perform, and continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain a further updated model resulting from synchronization of the local model for the current decision module with information from one or more other decision modules, such that the further updated model indicates one or more final control action determinations to perform for the time period for the current decision module, or an indication that no such synchronization was completed in the allowed time. The routine continues to block 660 to determine whether the synchronization was completed, and if so continues to block 665 to store the further updated model from the synchronization, and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators in the target system that modify values or otherwise manipulate one or more control elements of the target system, or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period. The routine may further optionally provide such information, as well as corresponding state information obtained in block 625, to one or more forecasting models (if any) used with the decision module, such as one or more forecasting models that provide forecast information in block 627, for use in improving further operation of the forecasting model(s)—in other embodiments, any such forecasting models and/or associated PVF modules may instead obtain such information in other manners, such as by retrieving information stored by the CDD system. After block 680, the routine continues to block 682 to determine whether to do a possible structural model adaptation update based on learned soft rules, such as periodically, based on whether or not a solution was found with respect to block 640, based on whether or not synchronization was done with respect to block 660, etc. If so, the routine continues to block 684 to initiate operations of the CDD Decision Module Construction component with respect to the data tomograph component in blocks 563-583, such as to return with an updated version of the model and/or a corresponding decision module.

After block 684, or if it was determined in block 682 to not do a possible structural model adaptation update based on learned soft rules, the routine continues to block 695 to determine whether to continue, such as until an indication to terminate or suspend is received (e.g., to reflect an end to current operation of the target system or an end of use of the decision module to control at least a portion of the target system). If it is determined to continue, the routine returns to block 620 to start the next time period, and otherwise continues to block 699 and ends.

Figure 7A:
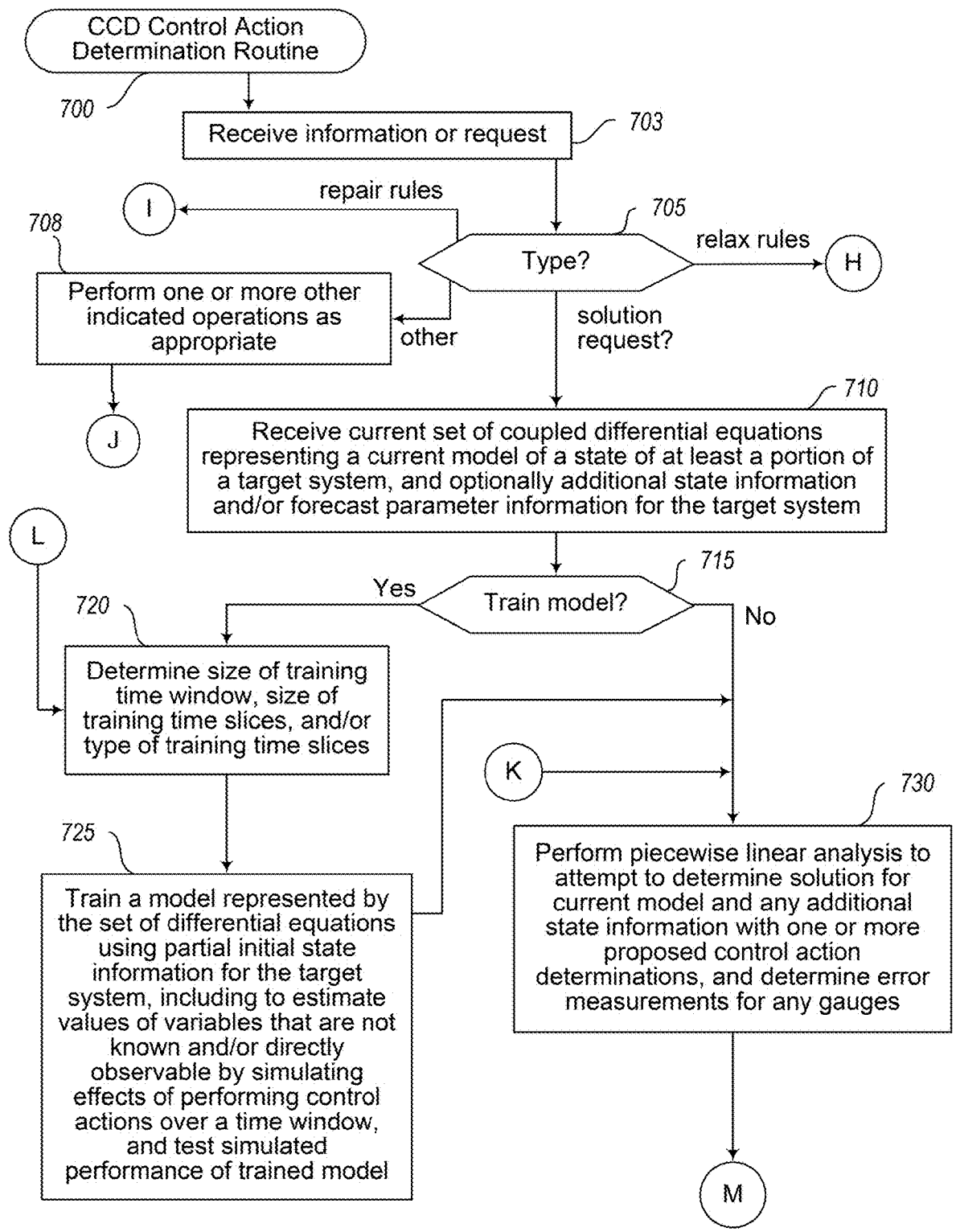
FIGS. 7A-7B illustrate a flow diagram of an example embodiment of a CDD Control Action Determination routine.
Figure 7B:
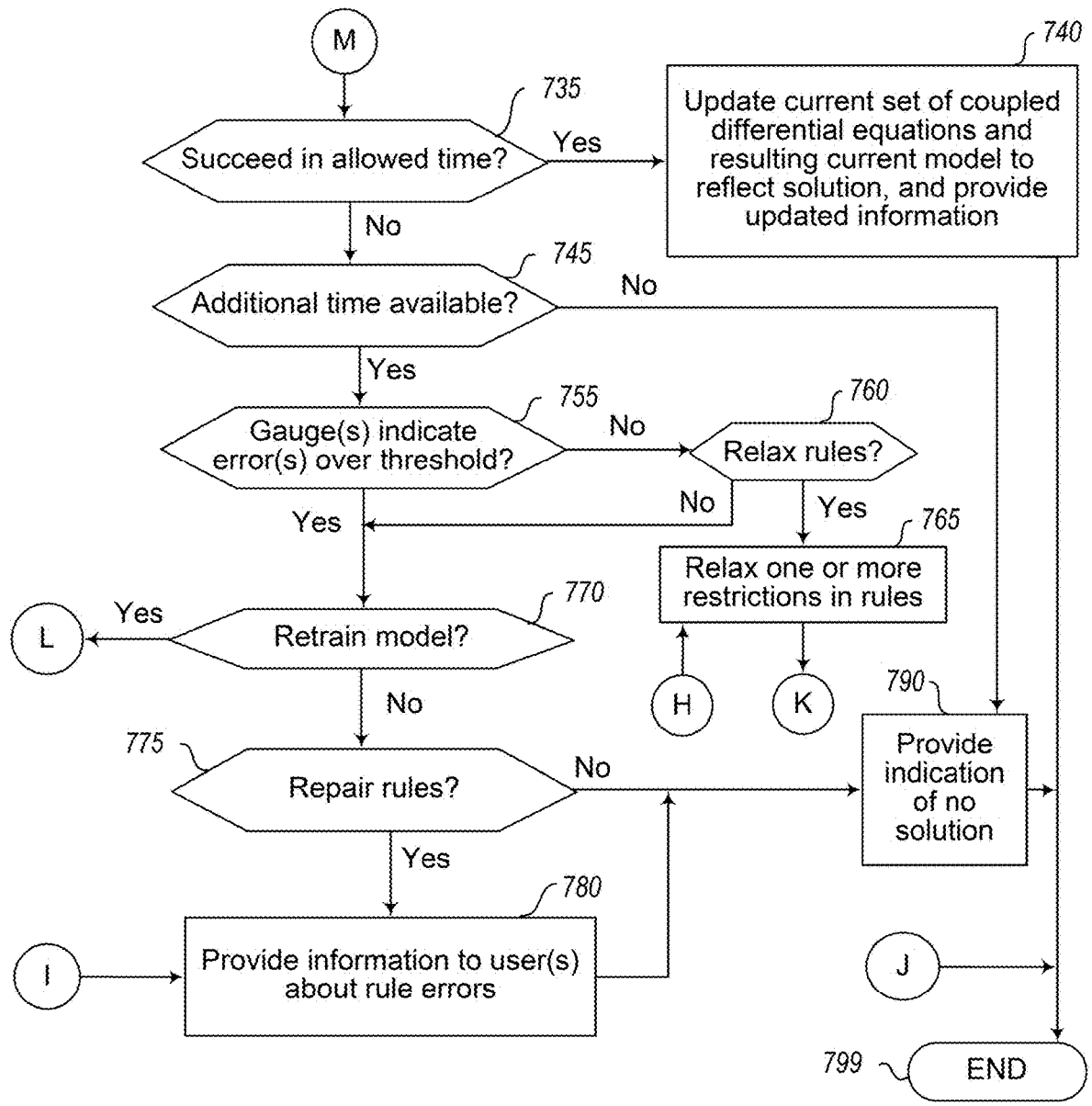

FIGS. 7A-7B are a flow diagram of an example embodiment of a CDD Control Action Determination routine 700. The routine may, for example, be provided by execution of the component 344 of FIG. 3 and/or components 144a-n or 184 of FIG. 1B, such as to determine control actions for a decision module to propose and/or implement for a target system during a particular time period, including in some embodiments to perform an optimization to determine near-optimal actions (e.g., within a threshold of an optimal solution) to perform with respect to one or more goals if possible. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to attempt to determine a solution for a current time period given a current model of the local decision module, the routine continues to block 710 to begin to perform such activities, as discussed in greater detail with respect to block 710-790. If it is instead determined in block 705 that a request to relax one or more rules or other restrictions for the current model of the local decision module is received, such as discussed in greater detail with respect to blocks 760 and 765, the routine continues to block 765. If it is determined in block 705 that a request is received to repair one or more rules or other restrictions for the current model of the local decision module, such as discussed in greater detail with respect to blocks 775 and 780, the routine continues to block 780 to obtain user input to use during the rule repair process (e.g., to interact with a CDD Decision Module Construction component, or to instead interact with one or more users in another manner), such as to allow the current model for the local decision module to later be updated and replaced based on further resulting user actions, or if operation of the target system can be suspended, to optionally wait to further perform the routine 700 until such an updated model is received. If it is instead determined in block 705 that the information or request is of another type, the routine continues instead to block 708 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, such as results from interactions performed in block 780), to receive current state information for the target system, such as for use as discussed in routine 600 of FIGS. 6A-6B, etc.

If it determined in block 705 that a request for a solution was received in block 703 for a current time period and based on a current model of the local decision module, the routine continues to block 710 to receive a current set of coupled differential equations that represent the current model for the local decision module of at least a portion of the target system, optionally along with additional state information for the target system for the current time and/or with forecast parameter information for the target system for the current time. The routine then continues to block 715 to determine whether to train or re-train the model, such as if the routine is called for a first time upon initial execution of a corresponding decision module or if error measurements from ongoing operations indicate a need for re-training, as discussed in greater detail with respect to blocks 755, 770 and 730. If it is determined to train or re-train the model, the routine continues to block 720 to determine one or more of the size of a training time window, size of training time slices within the time window, and/or type of training time slices within the training time window, such as in a manner similar to that previously discussed with respect to block 553 of routine 500 of FIGS. 5A-5C. After block 720, the routine continues to block 725 to use partial initial state information for the target system to train the model, including to estimate values of state variables for the target system that are not known and/or directly observable, by simulating effects of performing control actions over the time window for each of the time slices, as discussed in greater detail with respect to block 555 of routine 500 of FIGS. 5A-5C.

After block 725, or if it is instead determined in block 715 not to train or re-train the model, the routine continues to block 730 to perform a piecewise linear analysis to attempt to determine a solution for the current model and any additional state information that was obtained in block 710, with the solution (if determined) including one or more proposed control action determinations for the local decision module to take for a current time period, as well as in some embodiments to use one or more model error gauges to make one or more error measurements with respect to the current model, as discussed in greater detail elsewhere. The routine then continues to block 735 to determine if the operations in block 730 determined a solution within a amount of time allowed for the operation of block 730 (e.g., a defined subset or fraction of the current time period), and if so continues to block 740 to update the current set of coupled differential equations and the resulting current model for the local decision module to reflect the solution, with the resulting updated information provided as an output of the routine 700.

If it is instead determined in block 735 that the operations in block 730 did not determine a solution, the routine continues to block 745 to determine if additional time is available within the current time period for further attempts to determine a solution, and if not continues to block 790 to provide output of the routine 700 indicating that no solution was determined for the current time period.

If additional time is available within the current time period, however, the routine continues to perform blocks 755-780 to perform one or more further attempts to identify the solution—it will be appreciated that one or more of the operations of blocks 755-780 may be repeatedly performed multiple times for a given time period if sufficient time is available to continue further solution determination attempts. In particular, the routine continues to block 755 if additional time is determined to be available in block 745, where it determines whether the measurements from one or more gauges indicate model error measurements that are over one or more thresholds indicating modifications to the model are needed, such as based on the model error measurements from the gauges discussed with respect to block 730. If not, the routine continues to block 760 to determine whether there are one or more rules or other restrictions in the current model that are available to be relaxed for the current time period (that have not previously attempted to be relaxed during the time period, if this is not the first pass through this portion of the routing for the current time period), and if so continues to block 765 to relax one or more such rules or other restrictions and to return to block 730 to re-attempt the piecewise linear analysis with the revised model based on those relaxed rules or other restrictions.

If it is instead determined in block 755 that the model error measurements from one or more of the gauges are sufficient to satisfy one or more corresponding thresholds, the routine continues instead to block 770 to determine whether to re-train the model based on one or more of the gauges indicating sufficient errors to do so, such as based on accumulated errors over one or more time periods of updates to the model. If so, the routine returns to block 720 to perform such re-training in blocks 720 and 725, and then continues to block 730 to re-attempt the piecewise linear analysis with the resulting re-trained model.

If it is instead determined in block 770 not to re-train the model (or if the model was re-trained already for the current time period and the resulting re-attempt in block 730 again failed to find a solution), the routine continues to block 775 to determine whether the model error measurements from one or more of the gauges indicate a subset of one or more rules or other restrictions in the model that potentially have errors that need to be repaired. If so, the routine continues to block 780 to provide information to one or more users via the CDD Decision Module Construction component, to allow the users to revise the rules or other restrictions as appropriate, although in other embodiments some or all such rule repair activities may instead be attempted or performed in an automated manner. After block 780, or if it is instead determined in block 775 not to repair any rules, the routine continues to block 790 to provide an indication that no solution was determined for the current time period. After blocks 740, 708, or 790, the routine continues to block 799 and ends. It will be appreciated that if the routine 700 was instead implemented as a centralized routine that supports one or more decision modules remote from the executing component for the routine, the routine 700 may instead return to block 703 to await further information or requests.

Figure 8A:
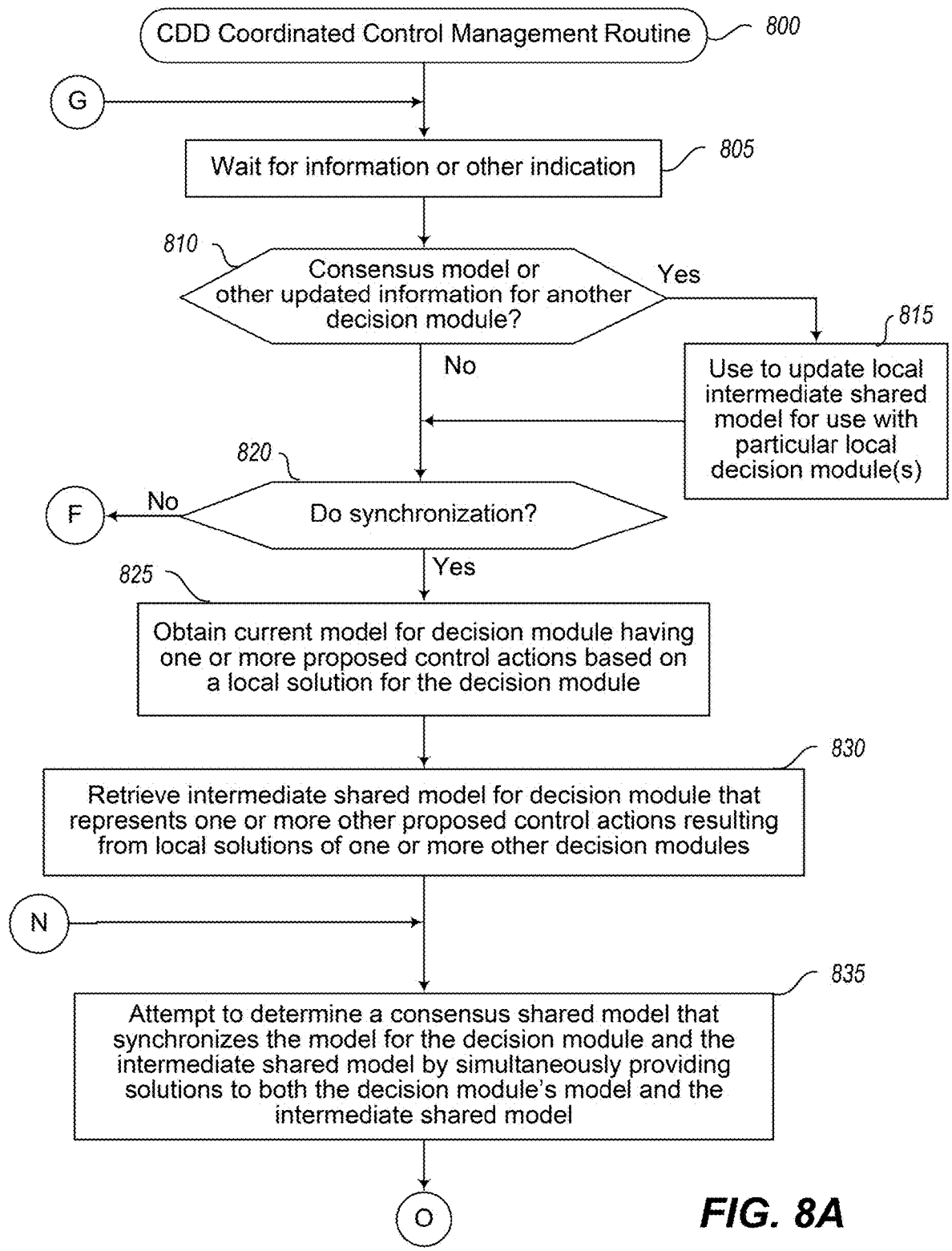
FIGS. 8A-8B illustrate a flow diagram of an example embodiment of a CDD Coordinated Control Management routine.
Figure 8B:
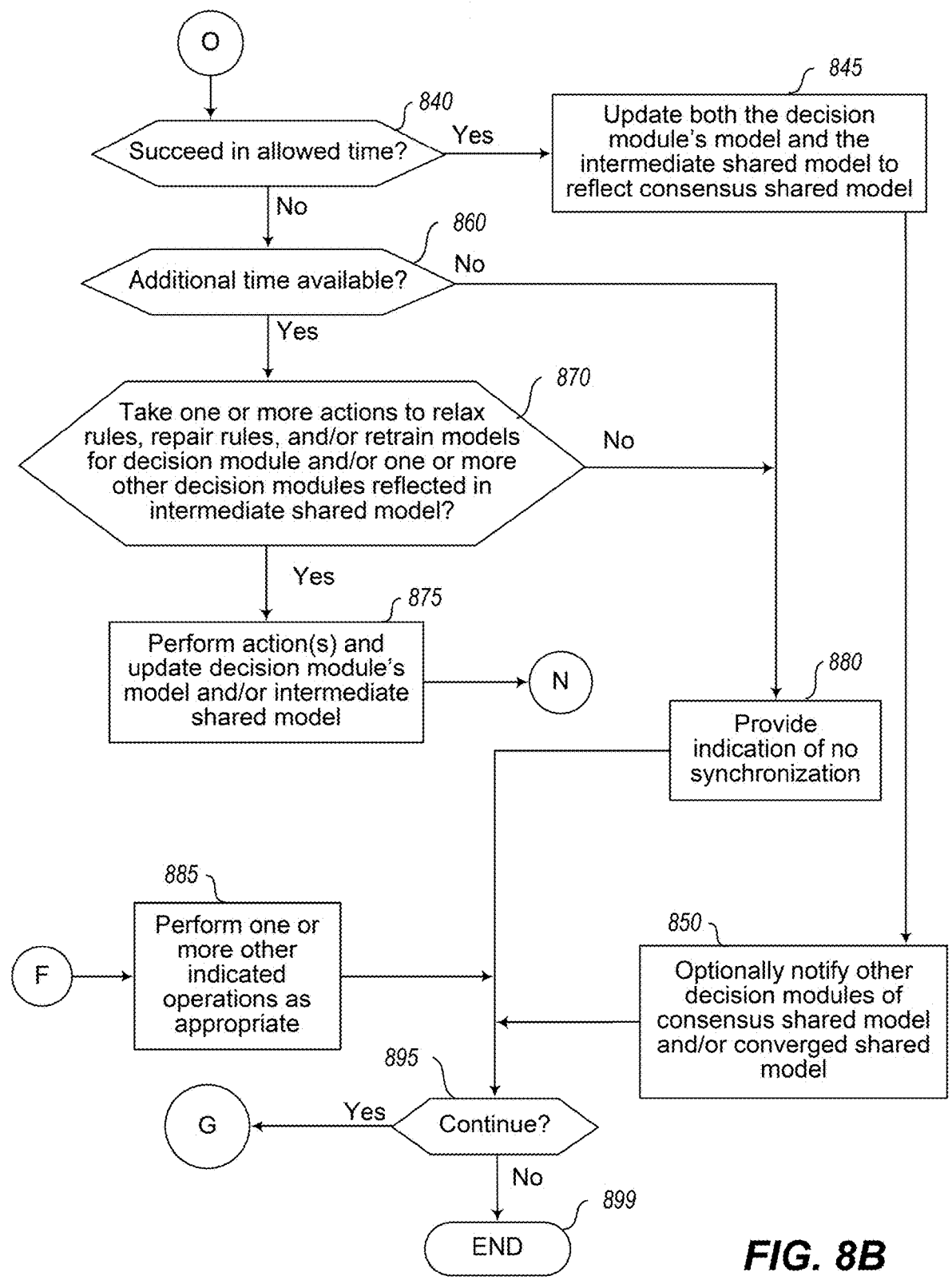

FIGS. 8A-8B are a flow diagram of an example embodiment of a CDD Coordinated Control Management routine 800. The routine may, for example, be provided by execution of the component 346 of FIG. 3 and/or the components 146a-n of FIG. 1B, such as to attempt to synchronize current models and their proposed control actions between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model, although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Determination component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 820-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local solution for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local solutions of those one or more other decision modules, optionally after partial or complete synchronization has been performed for those one or more other decision modules between themselves.

The routine then continues to block 835 to attempt to determine a consensus shared model that synchronizes the current model of the local decision module and the intermediate shared model by simultaneously providing solutions to both the local decision module's current model and the intermediate shared model. In some embodiments, the operations of block 835 are performed in a manner similar to that discussed with respect to blocks 710-730 of routine 700 of FIG. 7A-7B, such as if the local model and the intermediate shared model are combined to create a combination model for whom one or more solutions are to be identified. As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7A-7B, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available, and in a manner similar to that discussed with respect to blocks 745-780 of routine 700 of FIGS. 7A-7B. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time in a manner similar to that discussed with respect to routine 700, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

Figure 9:
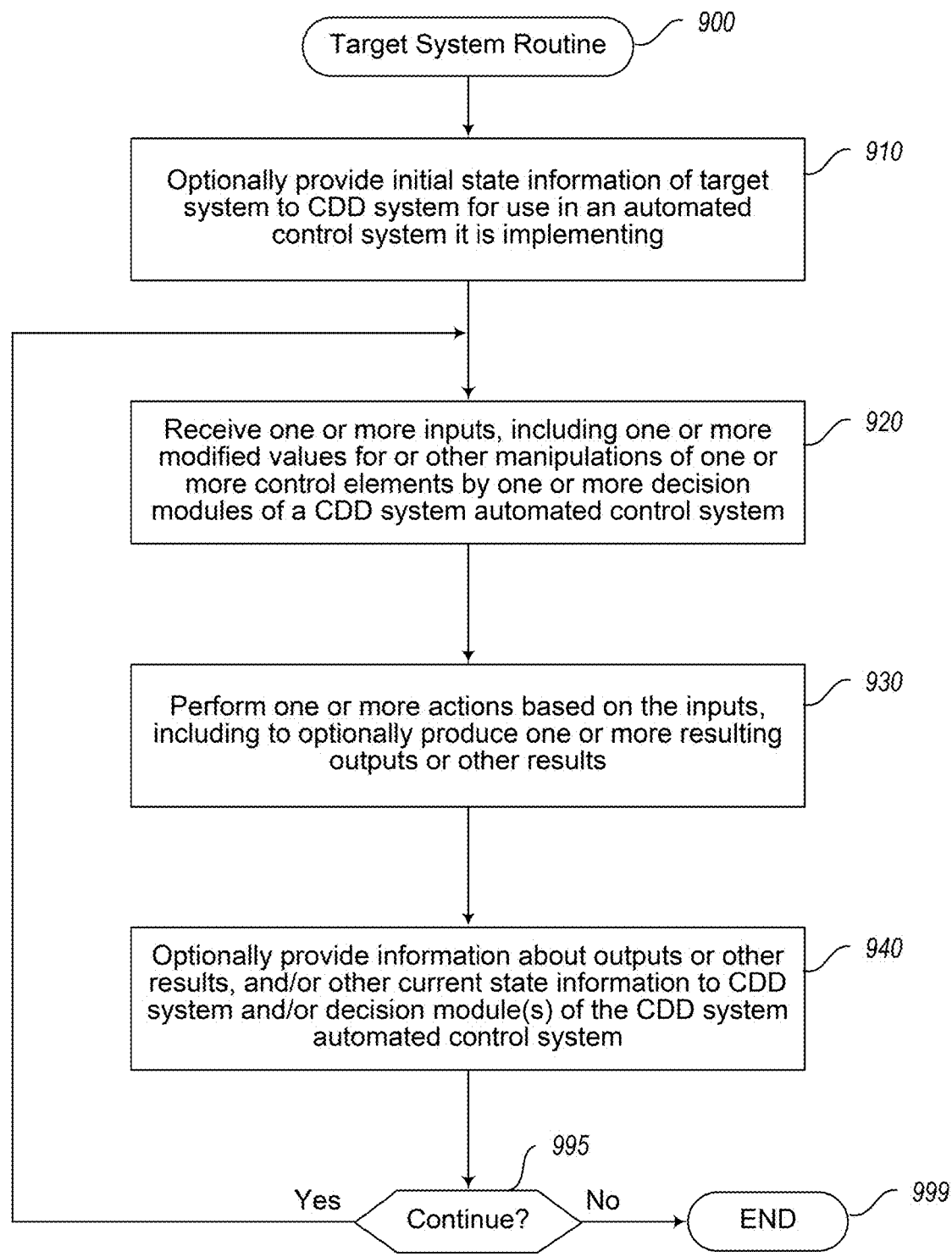
FIG. 9 illustrates a flow diagram of an example embodiment of a routine for a target system being controlled.

FIG. 9 illustrates a flow diagram of an example embodiment of a routine 900 performed for a representative generic target system, with respect to interactions between the target system and one or more decision modules that are controlling at least a portion of the target system. The routine may, for example, be provided by execution of a target system 360 and/or 370 of FIG. 3, and/or a target system 160 and/or 170 of FIGS. 1A and 1B, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 910, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 910, the routine continues to block 920 to receive one or more inputs from a collective group of one or more decision modules that implement the automated control system for the target system, including one or more modified values for or other manipulations of one or more control elements of a plurality of elements of the target system that are performed by one or more such decision modules of the automated control system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the automated control system of the CDD system and/or to particular decision modules of the automated control system. The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular decision module may include requests from external systems to the target system, which the automated control system and its decision modules may determine how to respond to in one or more manners.

Figure 10A:
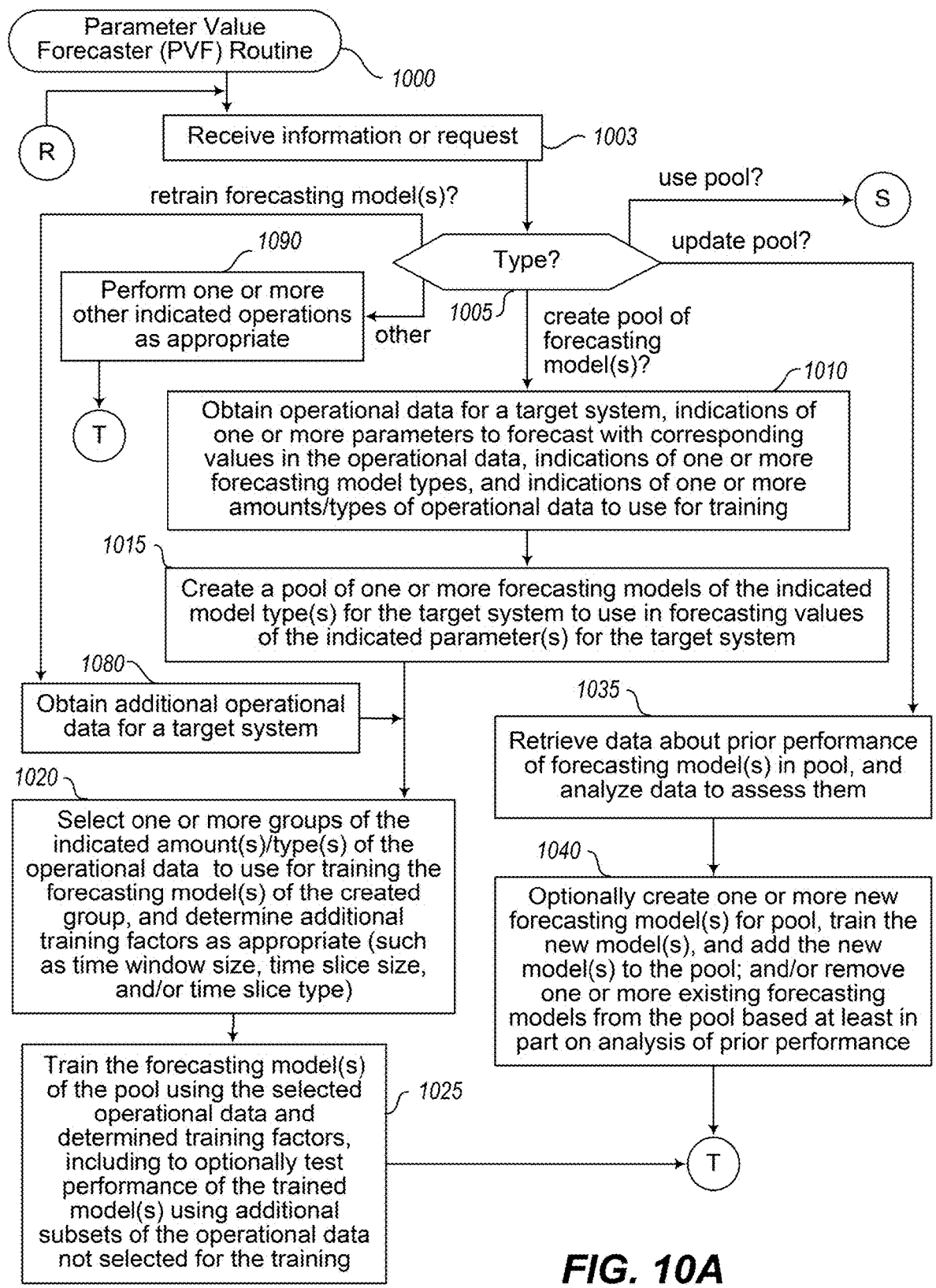
FIGS. 10A-10B illustrate a flow diagram of an example embodiment of a Parameter Value Forecaster routine.
Figure 10B:
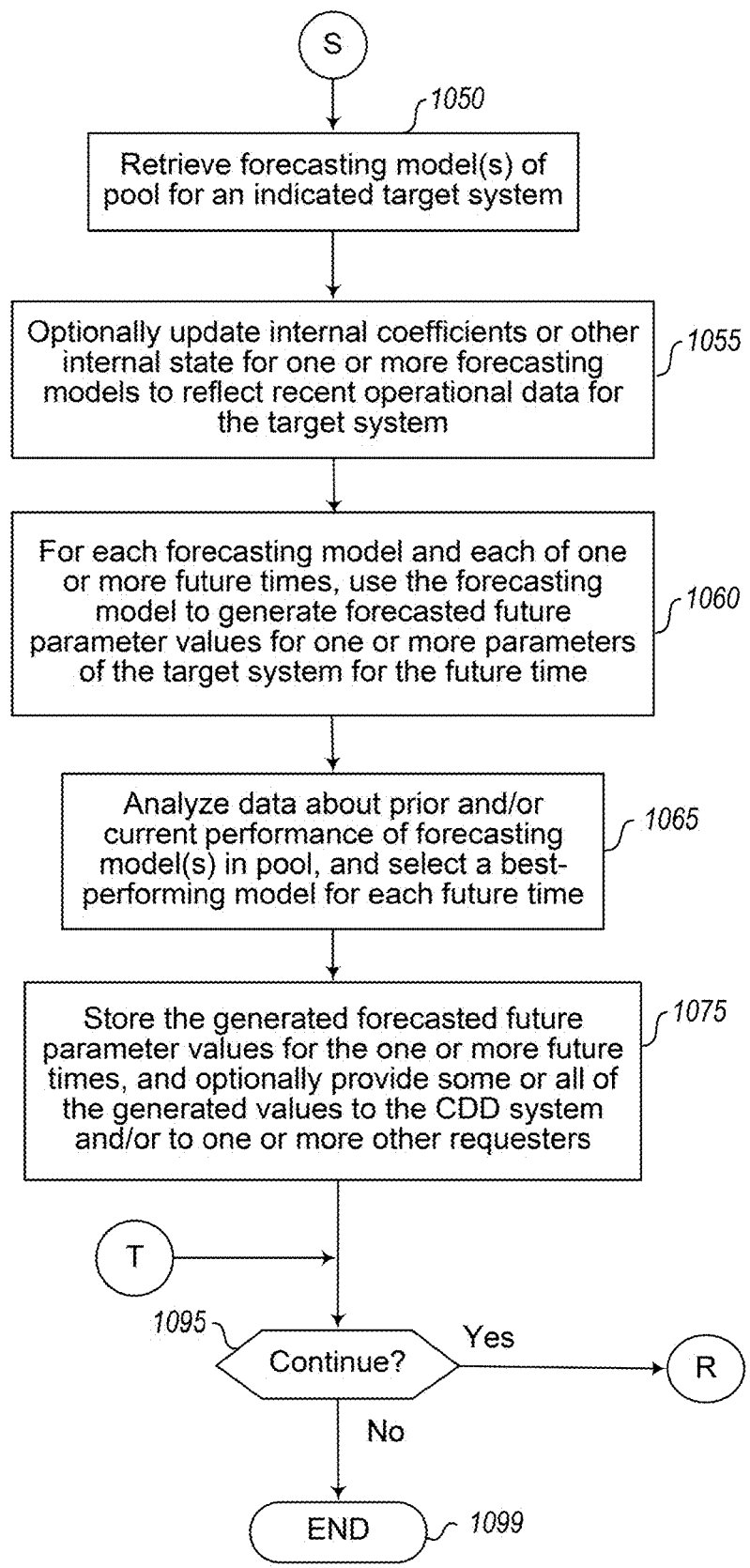

FIGS. 10A-10B illustrate a flow diagram of an example embodiment of a Parameter Value Forecaster routine 1000. The routine maybe provided by, for example, execution of one or more PVF components 345 of FIG. 3 and/or PVF components that support functionality as discussed with respect to FIGS. 1A-2D, such as to provide functionality to generate, train, use and update forecasting models that forecast information about future operations of one or more specified target systems. In at least some embodiments and situations, the routine may be part of one or more PVF components that are part of or otherwise operate in association with one or more target systems and/or one or more CDD systems, such as to provide forecast parameter information for use in the routines discussed with respect to FIGS. 4-9.

The illustrated embodiment of the routine begins at block 1003, where information or instructions are received. If it is determined in block 1005 that the information or instructions of block 1003 include an indication to create or revise one or more forecasting models for use as part of a pool to support a particular target system (e.g., to assist in automated control of the target system), the routine continues to perform blocks 1010-1025 to create and train such forecasting models for subsequent use. In particular, the routine obtains operational data in block 1010 corresponding to prior performance of the target system, such as by retrieving stored information, although in other embodiments and situations some or all of the obtained operational data may instead be from a different target system (e.g., another target system of the same type) or may be otherwise produced (e.g., simulated operational data). The routine further obtains information in block 1010 in the illustrated embodiment corresponding to the forecasting models to be generated for use with the target system, such as one or more types of forecasting models, one or more amounts/types of operational data to use for training (e.g., the last N data samples, where N is a specified number, and may differ for different forecasting models), and one or more parameters whose values are to be forecast for each forecasting model (e.g., with different parameters for different forecasting models)— such information may be obtained in various manners, such as to be dynamically specified by one or more users, and/or to be preconfigured (e.g., to always uses one or more specified types of forecasting models). In at least some embodiments, the indicated parameters will have corresponding values for one or more past times in the obtained operational data, along with associated values for other parameters, for use in training the forecasting models to forecast additional future values for the indicated parameters. After block 1010, the routine continues to block 1015 to create a pool of one or more forecasting models for use with the target system, using the obtained information from block 1010.

The routine then continues to blocks 1020 and 1025 to train the forecasting model(s) of the pool, such as by using a subset of the obtained operational data. In particular, the routine selects one or more groups of the obtained operational data in block 1020 to use for the training, as well as to optionally determine one or more additional training factors to use as appropriate, such as in a manner similar to that previously discussed with respect to blocks 553 and 555 of FIGS. 5A-5C. The routine then proceeds to train the forecasting model(s) of the pool in block 1025 using the selected and determined information from block 1020, including to optionally test performance of the trained model(s) using additional subsets of the operational data that was not selected for the initial training. While not illustrated in FIG. 10A, the operations of block 1025 may involve additional activities, such as to retrain or suspend (whether temporarily or permanently) use of any forecasting models for which the testing does not satisfy one or more specified criteria. The trained forecasting models are then stored or otherwise made available for use, such as to forecast future values for the indicated parameter(s) for one or more future times, as discussed in greater detail with respect to blocks 1050-1075.

If it is instead determined in block 1005 that the information or instructions of block 1003 are to use one or more existing forecasting models of a pool for a target system to generate forecast parameter values for one or more future times, the routine instead continues to block 1050. While the illustrated embodiment of the routine generates forecast parameter values for one or more future times, such as for later use at those future times, it will be appreciated that other embodiments may generate forecast parameter values for other times (whether in addition to or instead of for future times), such as for past, current and/or immediate future times. In block 1050, the routine retrieves one or more forecasting models of a pool for an indicated target system, such as for forecasting models previously generated and trained with respect to blocks 1010-1025. In block 1055, the routine then optionally updates internal coefficients or other internal state for one or more of the forecasting models, such as to reflect recent operational data for the target system, and/or to reset the forecasting models if bad training data has caused the prior performance of the forecasting models to be undesirable.

After block 1055, the routine generates forecasted future parameter vales for each of one or more future times and for each of the forecasting models, in a manner specific to the type of forecasting model, as discussed in greater detail elsewhere herein. In block 1065, the routine then optionally analyzes data about prior and/or current performance of one or some or all forecasting models in the pool, such as to assess the accuracy or other effectiveness of those forecasting models (e.g., with respect to how accurately forecast parameter values for an indicated time match actual values for the parameter(s) for that time). In some embodiments and situations, the assessment may include ranking the forecasting model(s) with respect to one or more criteria, such as accuracy. Furthermore, in at least some embodiments and situations, the resulting information from the assessment may be used to select a single 'best' forecasting model to use for each of the one or more future times, including to potentially change the 'best' forecasting model from the pool at different times, such as if a corresponding CDD system uses only the forecast parameter values from a single forecasting model or uses only one forecast value for a particular parameter even if multiple different forecasting models are forecasting values for that parameter. The routine then continues to block 1075 to store the generated forecasted future parameter values for the one or more future times for later use, and optionally further provides some or all of the generated values to the CDD system and/or to one or more other requesters (e.g., as discussed with respect to block 627 of FIG. 6A).

If it is instead determined in block 1005 that the information or instructions of block 1003 are to retrain one or more forecasting models of a pool for a target system using additional operational data (e.g., operational data generated from controlling the target system using, in part, forecast parameter values from a current or prior version of the one or more forecasting models), the routine instead continues to block 1080 to obtain the additional operational data (e.g., retrieve it from storage, wait until further operation of the target system causes the data to be produced, etc.), and then continues to block 1020.

If it is instead determined in block 1005 that the information or instructions of block 1003 are to update a pool of one or more forecasting models for a target system, such as to add and/or remove one or more forecasting models from the pool, the routine instead continues to block 1035 to obtain data about prior performance of one or some or all forecasting models in the pool (e.g., retrieve it from storage, wait until further operation of the target system causes the data to be produced, etc.), and then analyzes the data to assess the accuracy or other effectiveness of those forecasting models (e.g., with respect to how accurately forecast parameter values for an indicated time match actual values for the parameter(s) for that time). In some embodiments and situations, the assessment may include ranking the forecasting model(s) with respect to one or more criteria, such as accuracy. The routine then continues to block 1040 to optionally modify the forecasting models that are part of the pool, such as to remove one or more existing models from the pool based on the analysis of their past performance (e.g., to remove the lowest ranked M forecasting models), and/or to add one or more new forecasting models to the pool by generating, training, testing and saving them in a manner similar to that discussed with respect to blocks 1010-1025. For example, in at least some embodiments and situations, one or more new forecasting models may be added that are of the same type as one or more previously existing forecasting models in the pool, but with different amounts and/or types of operational data (whether more or less, overlapping or completely separate, etc.) used for training the new forecasting models relative to the previously existing forecasting models. Additional details are included elsewhere herein regarding creating, using, retraining and updating forecasting models used with target systems.

If it is instead determined in block 1005 that the information or instructions of block 1003 are to perform one or more other indicated types of operations, the routine instead continues to block 1090 to perform such other operations as appropriate. Such other operations may include, for example, one or more of the following: receiving and responding to requests for forecast parameter values (e.g., from a CDD system controlling a target system), such as by retrieving and providing stored information that was previously generated and/or dynamically generating and providing some or all such information; receiving and storing configuration information for later use (e.g., information about types of forecasting models, types of training factors, etc.); receiving and storing operational data for one or more target systems, whether from operation that corresponds to use of previously generated forecast parameter values or not (e.g., such as data generated in block 680 of FIG. 6B and/or in block 940 of FIG. 9, etc.); receiving and responding to requests for one or more generated and trained forecasting models (e.g., the forecasting models of a pool); etc.

After blocks 1025, 1040, 1075 or 1090, the routine continues to block 1095 to determine whether to continue, such as until an explicit indication to terminate is received. If it is determined to continue, the routine returns to block 1003, and otherwise continues to block 1099 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

Figure 12:
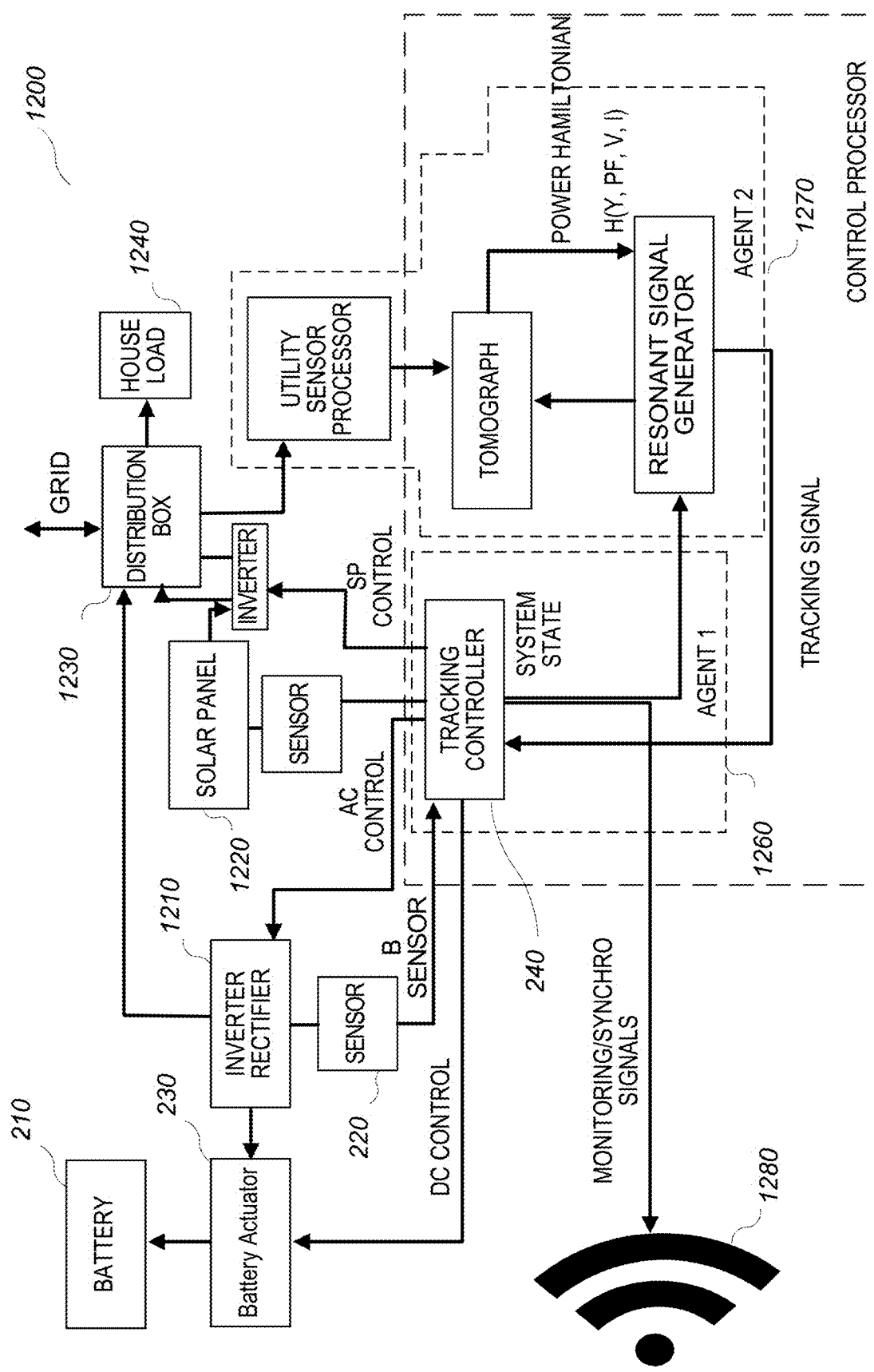
FIG. 12 is a block diagram illustrating example components of an embodiment of a system for performing automated control of DC power from a battery that is part of a home electrical power system with solar power being generated, with the home power generation and use being monitored and synchronized by an external entity.

FIG. 12 illustrates an embodiment of controlling a battery as part of a larger target system, which in this example is a system 1200 involving a home power system that includes a solar panel—thus, the example embodiments discussed previously with respect to FIG. 2A and/or elsewhere herein may in some situations be used as part of a larger system such as the example system 1200. In particular, the block diagram of FIG. 12 illustrates example components of an embodiment of a system 1200 for performing automated control of DC power from a battery that is part of a home electrical power system with solar power being generated, such as in a real-time manner and/or to optimize long-term operation of the battery, and with the home power generation and use being monitored and synchronized by an external entity, such as an entity providing or managing one or more CDI agents to control the battery of the system 1200. In the example of FIG. 12, the example home's power system is also connected to an external electrical grid from which it receives power and provides power at various times, with the battery serving to store electrical power generated by the solar power system and to supply power to the house and/or to the electrical grid as appropriate.

In the illustrated example of FIG. 12, components similar to those of FIG. 2A continue to be illustrated, including a battery 210, a sensor module 220, an actuator 230 for the battery, an on-site battery tracking controller 240, etc. In the example of FIG. 12, however, the CDI agent 250 of FIG. 2A is not illustrated as part of the components present at the physical location of the example house, such as if the CDI agent 250 in use with respect to FIG. 12 instead executes in a remote location (e.g., in the cloud or other computer network location) and provides tracking and/or synchronization signals to the battery tracking controller 240 of FIG. 12 in a manner similar to that illustrated with respect to FIG. 2A. Such tracking and/or synchronization signals may, for example, include desired power output of the battery and/or desired battery parameters (e.g., internal temperature, voltage, current, etc.) for a current time or immediately subsequent time. In addition, as discussed in greater detail elsewhere herein, the CDI agent(s) may generate such tracking and/or synchronization signals based on monitored information about the battery 210 (and any other batteries being controlled), power requests from the utility managing the external electrical grid, defined constraints or other rules to be used, forecasted power-related values, etc. While separate PVF components are not illustrated in this example embodiment, they may operate as part of, for example, one or more other components such as components 240, 1260 and/or 1270.

In addition, a number of additional components are illustrated in FIG. 12, including an inverter/rectifier module 1210 that receives output power from the battery and/or supplies electrical power to the battery for storage, a solar panel 1220 that generates electrical power and that has its own associated sensor and inverter, a distribution box 1230 that receives and/or supplies power to an external electrical grid and that controls power distribution to a load 1240 for the house, etc. In addition, two local control agents 1260 and 1270 are illustrated to assist in controlling operation of the battery tracking controller 240 of FIG. 12, with Agent1 1260 interacting directly with the battery tracking controller, and Agent2 1270 performing activities to synchronize the AC phase of the power for the battery with that of the house power system and/or grid, such as to provide resonance for the power being received and/or provided. The battery tracking controller 240 and agents 1260 and 1270 (other than the utility sensor processor) are together referred to as a 'control processor' in this example, with the battery tracking controller providing system status updates, and with communications between the agents being managed to support such a multi-agent architecture. The tomography of Agent2 tracks dynamic changes in the battery state using a non-destructive x-ray. In addition, an external entity 1280 (e.g., the utility providing or managing the external electrical grid) is providing monitoring and synchronization signals in this example to the battery tracking controller 240, such as coordinate the power being used and/or provided via numerous such home power systems and/or other customers.

While the example of FIG. 12 involves use of the battery 210 in a solar panel system, it will be appreciated that batteries may be charged and/or discharged in a variety of types of environments and systems, and similar activities of a corresponding CDI agent may be used to control such activities in the manner described herein.

Figure 13:
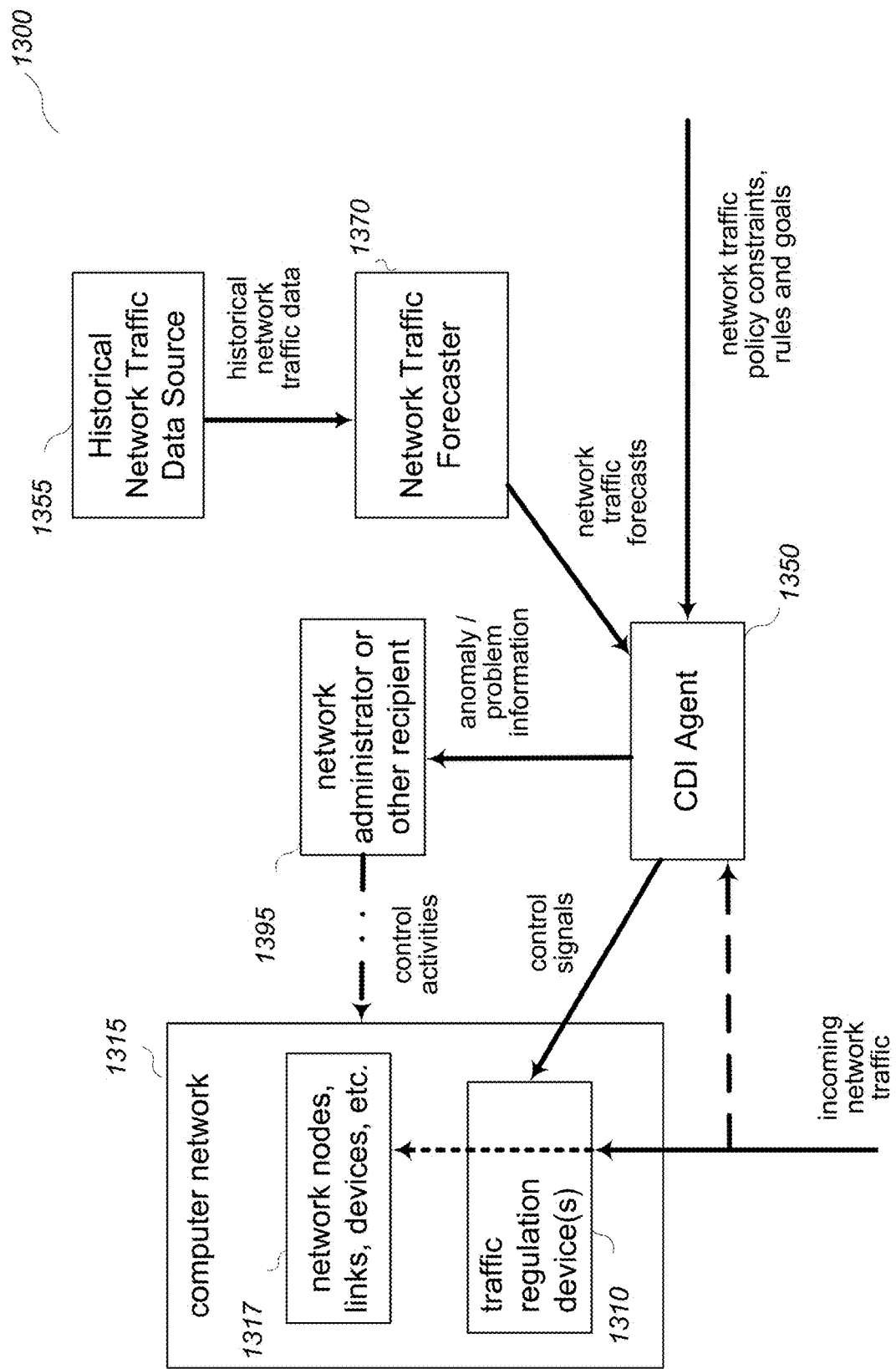
FIG. 13 is a block diagram illustrating example components of an embodiment of a system for performing automated control of operations of a computer network based in part on automated forecasts related to network traffic.

Rather than controlling a target control system with one or more batteries, the physical target system may in some embodiments include one or more computer networks over which network traffic passes and that include firewall devices and/or other devices that can regulate some or all of the network traffic, as noted above, and the automated operations to control the target system may include using characteristics of network traffic to perform automated control of the firewall devices or other regulation devices, with the operations of the PVF system including forecasting future network traffic that is expected to occur and using the forecasted data to control the firewall devices or other regulation devices (or to take other actions to perform to address problems and identify significant differences between actual and forecasted network traffic). Examples of such embodiments include predicting network activity in a real time or near-real time manner (e.g., relative to arrival of the network track being analyzed, within less than a second, or within a small defined number of seconds or minutes), and use this prediction to detect network anomalies or cyber-security attacks. The predictive model may be based on, for example, any of the following: number of packets received each minute; number of packets sent each minute; total size of packets received each minute; total size of packets sent each minute; number or size of packets received/sent to a defined set of one or more destinations each minute (e.g., to known blacklisted IP addresses, to specified octets, to data across a certain port, to a combination of sent-received IP addresses/ports, etc.); etc. After a defined period of time (e.g., a minute) passes, the observed data is compared with the predicted, and a sufficiently large discrepancy (e.g., above a defined threshold) indicates an anomaly to be investigated or otherwise handled. For example, where $x_n$ is number of packets received at minute n, a process model $$\begin{bmatrix} x_n \\ x_{n-1} \end{bmatrix} = \begin{bmatrix} a_{11} & a_{12} \\ 1 & 0 \end{bmatrix} \begin{bmatrix} x_{n-1} \\ x_{n-2} \end{bmatrix}$$

and observation model $$x_n = \begin{bmatrix} 1 & 0 \end{bmatrix} \begin{bmatrix} x_n \\ x_{n-1} \end{bmatrix}$$

may be used as part of the forecasting, such as without normalization of the number of packets, but using log-normalization for the total size of packets sent. It will be appreciated that forecasting future network traffic that is expected to occur and/or using such forecasted data may be performed in other manners in other embodiments. FIG. 13 illustrates a system 1300 illustrating example components of an embodiment of a system for performing automated control of operations of a computer network based in part on automated forecasts related to network traffic. The system 1300 includes a Network Traffic Forecaster component 1370 that obtains input data from one or more components 1355 (e.g., information about past network traffic), and generates and provides forecasted data about future network traffic. The CDI agent 1350 uses the forecasted data, as well as other network traffic policy information and information about current network traffic, and generates output signals to control operations of one or more traffic regulation devices 1310 and/or to provide information about identified anomalies or other problems to one or more recipients 1395. It will be appreciated that computer networks may include a variety of additional nodes, links and other components that are not illustrated here for the sake of brevity.

Figure 11:
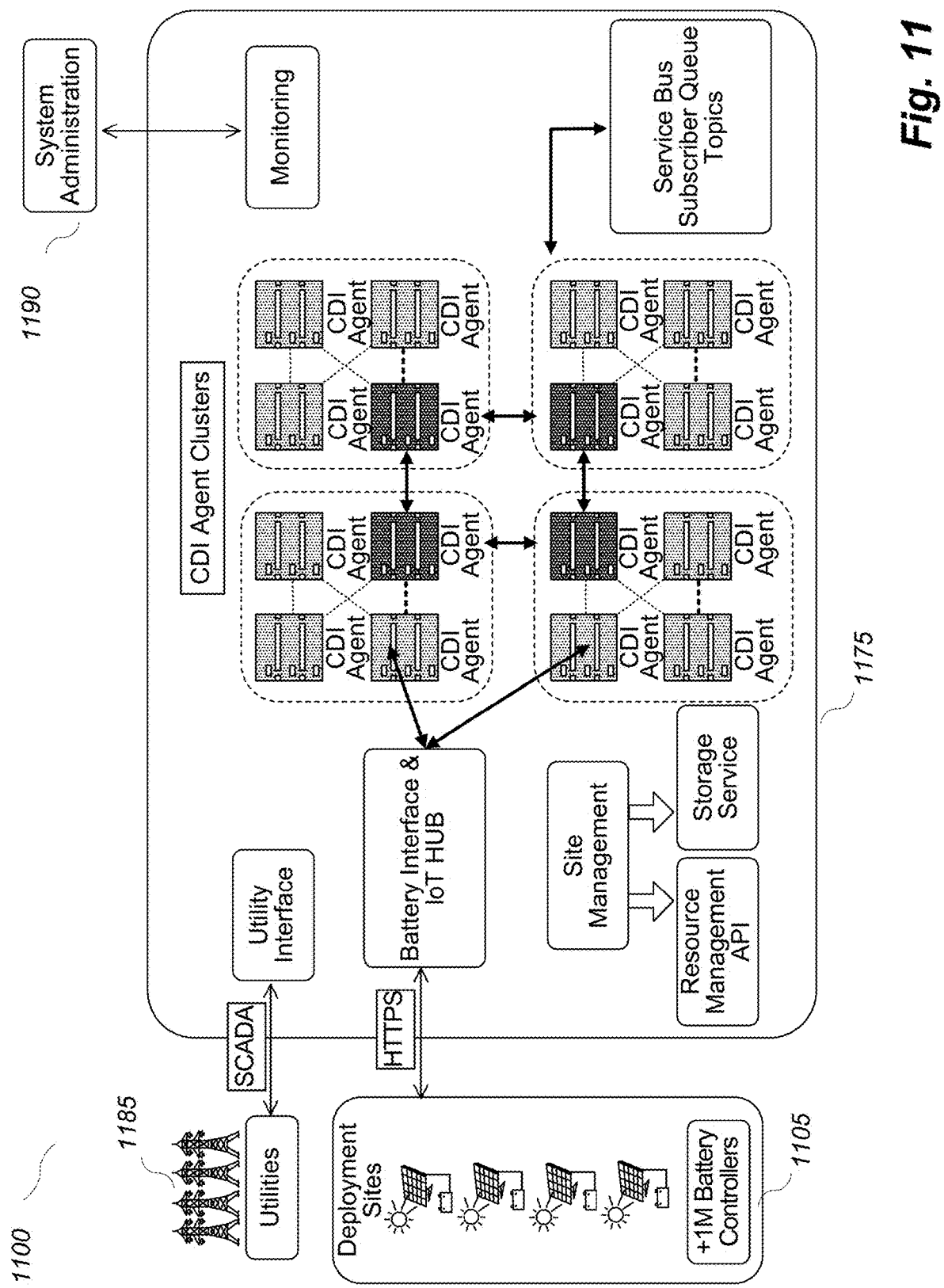
FIG. 11 is a block diagram illustrating example components of an embodiment of a system that performs automated control of DC power from multiple batteries in a coordinated manner.

FIG. 11 is a block diagram illustrating example components of an embodiment of a system 1100 that performs automated control of DC power from multiple batteries in a coordinated manner, such as in a real-time manner and to optimize long-term operation of the batteries. In particular, the system 1100 of FIG. 11 has some similarities to that of FIG. 12, but illustrates an example architecture of a system to support coordinated control of large numbers of batteries and associated systems (e.g., over one million such batteries and associated systems in this example, such as to correspond to one or more regions, states, countries, etc.). In particular, in the illustrated example, various batteries and associated systems 1105 (e.g., home power systems with solar panels) having on-site battery tracking controllers are illustrated, along with one or more utilities 1185 that provide power requests for the batteries and associated systems 1105, and one or more entities 1190 serving as system administration to manage a distributed control system 1175 for the batteries and associated systems 1105. While separate PVF components are not illustrated in this example embodiment, they may operate as part of, for example, one or more other components such as the CDI Agents in the clusters.

In this example, the distributed control system 1175 is implemented in a centralized manner in a network-accessible location, such as via an online computing environment (e.g., Microsoft Azure), although it may be implemented in other manners in other embodiments. The distributed control system 1175 includes one or more components to interface with and interact with the utilities 1185, one or more components to interface with and interact with the batteries and associated systems 1105, and one or more monitoring and/or configuration components with which the system administration entities 1190 may interact to monitor and/or control the distributed control system 1175. In addition, the various CDI agents that support the batteries and associated systems 1105 (e.g., with one CDI agent per battery pack and associated system) are executed in the network-accessible location and are clustered together, with various inter-cluster communication mechanisms used (e.g., a publish/subscribe system with various topics, a communication service bus between at least some CDI agents and/or clusters, etc.). The clusters may be formed in various manners in various embodiments, such as to group CDI agents based on having associated batteries and systems that share one or more characteristics, such as geographical location (e.g., being part of the system electrical grid substation area) and/or operating characteristics. In addition, the clusters may be used to coordinate the CDI agents in stages and/or tiers, such as to first coordinate the CDI agents within a cluster, then coordinate between two or more clusters, etc., and optionally with multiple tiers of clusters (e.g., structured in a hierarchical manner). Various additional components may be provided and used as part of the distributed control system 1175, such as a site management system to manage changes in CDI agents and/or batteries and associated systems (e.g., to add new CDI agents for new battery systems and/or to remove existing CDI agents for existing battery systems being removed from system 1175 management; to add new CDI agents to particular clusters and/or to remove existing CDI agents from clusters; to create, remove and modify clusters; etc.), storage services available from the network-accessible location to store state information and other information being used, resource management services available from the network-accessible location to manage computing resources provided by the network-accessible location, etc.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving, by one or more computing systems, rules modeling operation of a target physical system that includes a battery with at least one electrical load and at least one electrical source and that has sensors and one or more controls and one or more outputs, wherein the sensors measure information about a state of elements of the target physical system, wherein the one or more controls provide instructions to cause supplying a specified amount of energy from the battery or receiving a specified amount of energy by the battery and at least one control is manipulatable to modify at least one output of the target physical system, wherein the outputs include the energy being provided to or from the battery, and wherein the rules specify conditions involving state information to be evaluated to reach values for resulting control actions to take to manipulate the one or more controls;
creating, by the one or more computing systems, and from at least the rules and a goal specified for the target physical system and state information for the target physical system, a target system model describing a state of the target physical system that includes coupled differential equations, wherein the specified goal for the target physical system is to maximize life of the battery while supplying energy from the battery according to indicated criteria;
creating, by the one or more computing systems, a pool of multiple forecasting models that are alternatives for forecasting future values for parameters affecting operation of the target physical system, including training the one or more forecasting models using data from the operation of the target physical system, wherein the creating of the pool of multiple forecasting models includes using a plurality of forecasting techniques for respective forecasting models in the pool and includes using a plurality of training data sets from the operation of the target physical system for training respective forecasting models in the pool; and
controlling, by the one or more computing systems and without further user input, the operation of the target physical system for an indicated time by using the multiple forecasting models of the pool, including:
obtaining sensor information that identifies state information at the indicated time for at least one sensor of the target physical system;
assessing performance of the multiple forecasting models based at least in part on accuracy of respective previous forecasts of values for parameters affecting operation of the target physical system, and selecting, from the multiple alternative forecasting models and based at least in part on the assessed performance, a single forecasting model for use at the indicated time, wherein the selected single forecasting model uses a first forecasting technique that differs from one or more other forecasting techniques of the plurality of forecasting techniques used by other forecasting models of the pool, and wherein the selected single forecasting model uses a first training data set that differs from one or more other training data sets of the plurality of training data sets used by other forecasting models of the pool;
obtaining, from the selected single forecasting model, one or more forecast parameter values for the indicated time that were previously generated and are for one or more parameters affecting operation of the target physical system;

determining, using the target system model and based at least in part on the obtained sensor information and the obtained one or more forecast parameter values, at least one control action for the indicated time that manipulates at least one control of the target physical system and that provides a solution for the goal; and initiating performance of the at least one control action for the indicated time in the target physical system to manipulate the at least one control and to cause resulting changes in at least one output of the target physical system.

2. The computer-implemented method of claim 1 wherein the one or more computing systems include one or more first computing systems executing a collaborative distributed decision system, wherein the creating of the target system model is performed by the one or more first computing systems, and wherein the determining of the at least one control action is performed by the one or more first computing systems and includes performing a piecewise linear analysis of the coupled differential equations to identify the at least one control action.

3. The computer-implemented method of claim 2 wherein the target physical system includes a building with multiple rooms and with one or more temperature control units to perform at least one of heating or cooling the rooms of the building, wherein the controls include providing instructions to cause supplying a specified amount of the at least one of heating or cooling from the temperature control units, wherein the outputs include the at least one of heating or cooling being supplied from the temperature control units, and wherein the specified goal for the target physical system includes minimizing an amount of energy used by the temperature control units while performing the at least one of heating or cooling for the rooms of the building according to indicated criteria.

4. The computer-implemented method of claim 2 wherein the target physical system includes one or more computer networks over which network traffic passes and with one or more network devices to regulate the network traffic, wherein the controls include modifying settings of the one or more network devices that affect regulating of the network traffic, wherein the outputs include the regulated network traffic, and wherein the specified goal for the target physical system includes minimizing network traffic that is permitted by the one or more network devices and that does not satisfy one or more indicated criteria while permitting other network traffic that does satisfy the one or more indicated criteria.

5. The computer-implemented method of claim 2 wherein the rules modeling operation of the target physical system include one or more absolute rules that specify non-modifiable requirements regarding the operation of the target physical system and that are each evaluatable to reach a true or false value, one or more hard rules that specify restrictions regarding the operation of the target physical system that can be modified in specified situations and that are each evaluatable to reach a true or false value, and one or more soft rules that specify one or more additional conditions to be evaluated to reach possible values other than true or false with an associated likelihood.

6. The computer-implemented method of claim 5 wherein the creating of the target system model includes generating, based at least in part on the rules, a rule-based Hamiltonian function that expresses the created target system model.

7. The computer-implemented method of claim 2 wherein the one or more computing systems further include one or more second computing systems executing one or more parameter value forecasting components, and wherein the creating of the pool of multiple forecasting models is performed by the one or more second computing systems.

8. The computer-implemented method of claim 7 further comprising forecasting, by the one or more second computing systems, and for each of the multiple forecasting models of the pool before the controlling of the operation of the target physical system, future values for the one or more parameters for each of multiple future times, and wherein the obtaining of the one or more forecast parameter values for the indicated time from the selected single forecasting model includes selecting, from the forecast future values for the multiple future times from the selected single forecasting model, at least one of forecast future values for one of the multiple future times that corresponds to the indicated time.

9. The computer-implemented method of claim 1 wherein the creating of the target system model includes generating, based at least in part on the rules, a rule-based Hamiltonian function that expresses the created target system model.

10. The computer-implemented method of claim 1 wherein the creating of the pool of multiple forecasting models using multiple forecasting techniques from a group of forecasting techniques that includes ordinary regression, ordinary autoregression, dynamic regression, dynamic autoregression, discounted dynamic regression, discounted dynamic autoregression, a Kalman filter with fixed coefficients, a dynamic Kalman filter with updatable coefficients, a neural network, a decision tree, and maintaining previous data.

11. The computer-implemented method of claim 1 further comprising, after the creating of the pool of multiple forecasting models and before the controlling of the operation of the target physical system for the indicated time, automatically removing at least one of the multiple forecasting models from the pool based at least in part on a further assessed performance that occurs before the controlling of the operation of the target physical system for the indicated time, and wherein the selected single forecasting model is one of two or more forecasting models that remain in the pool after the removing.

12. The computer-implemented method of claim 1 further comprising, after the creating of the pool of multiple forecasting models and before the controlling of the operation of the target physical system for the indicated time, obtaining additional operational data from operation of the target physical system and adding an additional forecasting model to the pool that is based at least in part on the additional operational data, and wherein the selected single forecasting model is the additional forecasting model.

13. The computer-implemented method of claim 1 wherein the creating of the pool of multiple forecasting models includes training one or more forecasting models of the multiple forecasting models using the first training data set that is also used for the selected single forecasting model, and wherein the one or more forecasting models are different from the selected single forecasting model and use one or more forecasting techniques from the plurality of forecasting techniques that are different from the first forecasting technique used by the selected single forecasting model.

14. The computer-implemented method of claim 1 wherein the creating of the pool of multiple forecasting models includes training one or more forecasting models of the multiple forecasting models using one or more training data sets that are different from the first training data set used for the selected single forecasting model, and wherein the one or more forecasting models use the first forecasting technique that is also used by the selected single forecasting model.

15. The computer-implemented method of claim 1 further comprising, after the controlling of the operation of the target physical system for the indicated time and without further user input:
   obtaining operational data of the target physical system from the performance of the at least one control action for the indicated time;
   retraining one or more of the multiple forecasting models in the pool based at least in part on the obtained operational data; and
   controlling the operation of the target physical system for multiple additional indicated times based in part on using additional forecast parameter values generated using the retrained one or more forecasting models.

16. The computer-implemented method of claim 1 further comprising, after the controlling of the operation of the target physical system for the indicated time and without further user input:
   obtaining operational data of the target physical system from the performance of the at least one control action for the indicated time;
   updating internal state information for one or more of the multiple forecasting models in the pool based at least in part on the obtained operational data; and
   controlling the operation of the target physical system for multiple additional indicated times based in part on using additional forecast parameter values generated using the one or more forecasting models with the updated internal state information.

17. The computer-implemented method of claim 1 further comprising obtaining operational data of the target physical system from the performance of the at least one control action for the indicated time, and automatically controlling the operation of the target physical system for one or more additional indicated times based in part on using additional forecast parameter values for the one or more parameters that were generated by the selected single forecasting models at the earlier time.

18. The computer-implemented method of claim 1 wherein the creating of the pool of multiple forecasting models includes using regression techniques for a first forecasting model and using Kalman filter techniques for a second forecasting model, and wherein the selected single forecasting model is one of the first and second forecasting models that is selected based at least in part on the respective one of the regression techniques or the Kalman filter techniques used by the one of the first and second forecasting models performing more accurately than an other of the respective one of the regression techniques or the Kalman filter techniques.

19. A non-transitory computer-readable medium having stored contents that cause one or more computing systems to perform a method, the method comprising:
   obtaining, by the one or more computing systems and for a target system that includes a battery with at least one electrical load and at least one electrical source and that has sensors and one or more controls and one or more outputs, a target system model that describes a state of the target system for a first time, wherein the sensors measure information about a physical state of elements of the target system, wherein the one or more controls include providing instructions to cause supplying a specified amount of energy from the battery or receiving a specified amount of energy by the battery and at least one control is manipulatable to modify at least one output of the target system, wherein the outputs include the energy being provided to or from the battery, and wherein the target system model is based on a goal specified for the target system and state information for the target system for the first time and rules that model operation of the target system, the rules specifying conditions involving state information to be evaluated to reach values for resulting control actions to take to manipulate the one or more controls, and the specified goal for the target physical system being to maximize life of the battery while supplying energy from the battery according to indicated criteria;
   assessing, by the one or more computing systems, performance of multiple alternative forecasting models that use one or more forecasting techniques and are trained using multiple sets of training data from previous operation of the target system, wherein the multiple alternative forecasting models each forecasts at least one future value at an indicated future time for a parameter related to operation of the target system, and wherein the assessing of each forecasting model is performed after that indicated future time based at least in part on accuracy of the respective at least one future value forecast by the forecasting model;
   selecting, by the one or more computing systems and from the multiple alternative forecasting models, a single forecasting model for further use based at least in part on the assessed performance of the selected single forecasting model;
   obtaining, by the one or more computing systems, and from the selected single forecasting model, one or more further forecast future values for one or more parameters related to operation of the target system; and
   controlling, by the one or more computing systems and based at least in part on the obtained one or more further forecast future values for the one or more parameters, the operation of the target system for an indicated time after the first time, including:
   obtaining sensor information that identifies state information at the indicated time for at least one sensor of the target system;
   selecting, from the obtained one or more further forecast future values, one or more forecast values for the indicated time that are for one or more parameters;
      determining, using the target system model and based at least in part on the obtained sensor information and the selected one or more forecast values, at least one control action for the indicated time that manipulates at least one control of the target system and that provides a solution for the goal; and
   providing information about the at least one control action for the indicated time, to initiate performance of the at least one control action in the target system to manipulate the at least one control and to cause resulting changes in at least one output of the target system.

20. The non-transitory computer-readable medium of claim 19 wherein the stored contents include software instructions that, when executed, further cause the one or more computing systems to create, from at least the rules and the specified goal and state information for the target system for the first time, the target system model, including to generate coupled differential equations for the target system model that describe the state of the target system for the first time, and wherein the determining of the at least one control action includes performing a piecewise linear analysis of the coupled differential equations to identify the at least one control action.

21. The non-transitory computer-readable medium of claim 19 wherein the stored contents include software instructions that, when executed, further cause the one or more computing systems to create the multiple forecasting models using the one or more forecasting techniques, to train the multiple forecasting models using the multiple sets of training data, and to use the trained multiple forecasting models to forecast the future values for the one or more parameters, and wherein the assessing and the selecting and the obtaining of the further forecast future values and the controlling are performed automatically without further user input.

22. The non-transitory computer-readable medium of claim 21 wherein the using of the trained multiple forecasting models to forecast the future values for the one or more parameters includes forecasting, before the controlling of the operation of the target physical system for the indicated time and for each of the multiple forecasting models, future values for the one or more parameters for each of multiple future times, and wherein the selecting of the one or more forecast values for the indicated time includes using the forecast future values from the selected single forecasting model for one of the multiple future times that corresponds to the indicated time.

23. The non-transitory computer-readable medium of claim 21 wherein the creating of the multiple forecasting models using multiple forecasting techniques from a group including ordinary regression, ordinary autoregression, dynamic regression, dynamic autoregression, discounted dynamic regression, discounted dynamic autoregression, a Kalman filter with fixed coefficients, a dynamic Kalman filter with updatable coefficients, a neural network, a decision tree, and maintaining previous data, wherein the selected single forecasting model uses a first forecasting technique of the multiple forecasting techniques and further uses a first training data set of the multiple sets of training data, and wherein training of two or more other forecasting models of the multiple forecasting models that differ from the selected single forecasting model includes training at least one other first forecasting model that uses at least one forecasting technique different from the first forecasting technique by using the first training data, and further includes training at least one other second forecasting model that uses the first forecasting technique by using at least one other training data set different from the first training data set.

24. The non-transitory computer-readable medium of claim 19 wherein the multiple alternative forecasting models include at least one first forecasting model using regression techniques and includes at least one second forecasting model using Kalman filter techniques, and wherein the stored contents further cause the one or more computing systems to obtain operational data of the target system from the performance of the at least one control action for the indicated time, and to automatically control the operation of the target system for multiple additional indicated times based in part on using, for one or more first indicated times of the multiple additional indicated times, additional forecast values for the one or more parameters that were generated by the at least one first forecasting model and on using, for one or more second indicated times of the multiple additional indicated times, additional forecast values for the one or more parameters that were generated by the at least one second forecasting model.

25. A system comprising:
one or more hardware processors of one or more computing systems; and
one or more memories storing instructions that, when executed by at least one of the one or more hardware processors, cause the system to implement an automated control system for a target system that includes a battery with at least one electrical load and at least one electrical source and that has sensors and one or more controls and one or more outputs, by:
obtaining a target system model that describes a state of the target system for a first time, wherein the sensors measure information about a physical state of elements of the target system, wherein the one or more controls include providing instructions to cause supplying a specified amount of energy from the battery or receiving a specified amount of energy by the battery and at least one control is manipulatable to modify at least one output of the target system, wherein the outputs include the energy being provided to or from the battery, and wherein the target system model is based on a goal specified for the target system and state information for the target system for the first time and rules that model operation of the target system, the rules specifying conditions involving state information to be evaluated to reach values for resulting control actions to take to manipulate the one or more controls, and the specified goal for the target physical system being to maximize life of the battery while supplying energy from the battery according to indicated criteria;
assessing performance of multiple alternative forecasting models that use multiple forecasting techniques and are trained using one or more sets of training data from previous operation of the target system, wherein the multiple alternative forecasting models each forecasts at least one future value at a indicated future time for a parameter related to operation of the target system, and wherein the assessing of each forecasting model is performed after that indicated future time based at least in part on accuracy of the respective at least one future value forecast by the forecasting model;
selecting, from the multiple alternative forecasting models, a single forecasting model for further use at an indicated time after the first time based at least in part on the assessed performance of the selected single forecasting model;
obtaining further forecast future values from the selected single forecasting model for one or more parameters related to operation of the target system; and
controlling, after generating of the forecast future values for the one or more parameters, the operation of the target system for the indicated time, including:
obtaining sensor information that identifies state information at the indicated time for at least one sensor of the target system;
determining, using the target system model and based at least in part on the obtained sensor information and on one or more of the obtained forecast future values that are for one or more parameters and for the indicated time, at least one control action for the indicated time that manipulates at least one control of the target system and that provides a solution for the goal; and providing information about the at least one control action for the indicated time, to initiate performance of the at least one control action in the target system to manipulate the at least one control and to cause resulting changes in at least one output of the target system.

26. The system of claim 25 wherein the stored instructions include software instructions that, when executed, further cause the system to create, from at least the rules and the specified goal and state information for the target system for the first time, the target system model, including to generate coupled differential equations for the target system model that describe the state of the target system for the first time, and wherein the determining of the at least one control action includes performing a piecewise linear analysis of the coupled differential equations to identify the at least one control action.

27. The system of claim 25 wherein the stored instructions include software instructions that, when executed, further cause the system to create the multiple forecasting models using the multiple forecasting techniques, to train the multiple forecasting models using multiple training data sets from previous operation of the target system, and to use the trained multiple forecasting models to forecast the future values for the one or more parameters, and wherein the assessing and the selecting and the obtaining of the further forecast future values and the controlling are performed automatically without further user input.

28. The system of claim 27 wherein the using of the trained multiple forecasting models to forecast the future values for the one or more parameters includes forecasting, before the controlling of the operation of the target physical system for the indicated time and for each of the multiple forecasting models, future values for the one or more parameters for each of multiple future times, and wherein the stored instructions further cause the system to select the one or more forecast values to use for the determining by using the forecast future values from the selected single forecasting model for one of the multiple future times that corresponds to the indicated time.

29. The system of claim 27 wherein the multiple alternative forecasting models includes at least one first forecasting model using regression techniques and includes at least one second forecasting model using Kalman filter techniques, and wherein the stored instructions further cause the system to obtain operational data of the target system from the performance of the at least one control action for the indicated time, and to control the operation of the target system without user input for multiple additional indicated times based in part on using, for one or more first indicated times of the multiple additional indicated times, additional forecast values for the one or more parameters that were generated by the at least one first forecasting model and on using, for one or more second indicated times of the multiple additional indicated times, additional forecast values for the one or more parameters that were generated by the at least one second forecasting model.

* * * * *